United States Patent
Hoskins et al.

(10) Patent No.: US 7,773,276 B2
(45) Date of Patent: Aug. 10, 2010

(54) METHOD FOR DETERMINING MEDIA ORIENTATION AND REQUIRED TEMPERATURE COMPENSATION IN PAGE-BASED HOLOGRAPHIC DATA STORAGE SYSTEMS USING DATA PAGE BRAGG DETUNING MEASUREMENTS

(75) Inventors: Alan Hoskins, Golden, CO (US); Adrian Hill, Lyons, CO (US)

(73) Assignee: Inphase Technologies, inc., Longmont, CO (US)

( * ) Notice: Subject to any disclaimer, the term of this patent is extended or adjusted under 35 U.S.C. 154(b) by 745 days.

(21) Appl. No.: 11/714,125

(22) Filed: Mar. 6, 2007

(65) Prior Publication Data

US 2007/0211321 A1    Sep. 13, 2007

Related U.S. Application Data

(60) Provisional application No. 60/779,444, filed on Mar. 7, 2006.

(51) Int. Cl.
   *G03H 1/22* (2006.01)
(52) U.S. Cl. ........................................... 359/32
(58) Field of Classification Search .................. None
   See application file for complete search history.

(56) References Cited

U.S. PATENT DOCUMENTS

| | | | |
|---|---|---|---|
| 5,058,124 A | | 10/1991 | Cameron et al. |
| 5,920,536 A | * | 7/1999 | Campbell et al. ........... 369/103 |
| 6,047,008 A | | 4/2000 | Funakawa |
| 6,103,454 A | | 8/2000 | Dhar et al. |
| 6,414,763 B1 | | 7/2002 | Hesselink et al. |
| 6,449,627 B1 | | 9/2002 | Baer et al. |
| 6,482,551 B1 | | 11/2002 | Dhar et al. |
| 6,614,566 B1 | | 9/2003 | Curtis et al. |
| 6,650,447 B2 | | 11/2003 | Curtis et al. |
| 6,743,552 B2 | | 6/2004 | Setthachayanon et al. |
| 6,765,061 B2 | | 7/2004 | Dhar et al. |
| 6,780,546 B2 | | 8/2004 | Trentler et al. |
| 7,092,133 B2 | | 8/2006 | Anderson et al. |
| 7,616,362 B2 | * | 11/2009 | Yoshikawa et al. ............ 359/10 |
| 2003/0206320 A1 | | 11/2003 | Cole et al. |
| 2004/0027625 A1 | | 2/2004 | Trentler et al. |
| 2007/0019267 A1 | * | 1/2007 | Kogure et al. .................. 359/24 |
| 2007/0216981 A1 | * | 9/2007 | Matsumura et al. ........... 359/24 |
| 2008/0008076 A1 | * | 1/2008 | Raguin et al. ................ 369/103 |

OTHER PUBLICATIONS

PCT/US2007/06094 International Search Report and the Written Opinion of the International Searching Authority, or the Declaration, mailed Aug. 22 2008.
PCT/US2006/19906 International Search Report and the Written Opinion of the International Searching Authority, or the Declaration, mailed Sep. 16, 2008.

* cited by examiner

*Primary Examiner*—Stephone B Allen
*Assistant Examiner*—Derek S Chapel
(74) *Attorney, Agent, or Firm*—Vedder Price P.C.; Ajay A. Jagtiani

(57) ABSTRACT

Methods and systems for calculating a wavelength to use for a reference beam in recovering data from a holographic storage medium along with calculating a rotation and a tilt for the storage medium in data recovery. These systems and method include determining intensity levels for a plurality of windows (or subsets of pixels) for a data page as the angle of the reference beam is adjusted. The angles corresponding to the angles where the maximum intensity of light is detected for each window is then used in determining the wavelength, tilt, and rotation in recovering subsequent data pages from the holographic storage medium.

21 Claims, 13 Drawing Sheets

METHOD FOR DETERMINING MEDIA ORIENTATION AND REQUIRED TEMPERATURE COMPENSATION IN PAGE-BASED HOLOGRAPHIC DATA STORAGE SYSTEMS USING DATA PAGE BRAGG DETUNING MEASUREMENTS

CROSS-REFERENCE TO RELATED APPLICATIONS

This application makes reference to and claims the priority date of co-pending U.S. Provisional Patent Application No. 60/779,444, entitled "A Method for Determining Media Orientation and Required Temperature Compensation in Page-Based Holographic Data Storage Systems Using Data Page Bragg Detuning Measurements" filed Mar. 7, 2006. The entire disclosure and contents of the above application is hereby incorporated by reference.

BACKGROUND

1. Field of the Invention

The present invention relates generally to page based holographic storage systems, and more particularly, to data retrieval from a holographic storage medium.

2. Related Art

In a common design for page-oriented holographic data storage systems, a coherent beam of light modulated with data is interfered with a plane-wave reference beam and the resulting interference pattern is recorded in a holographic medium. This recorded pattern can be read out with an identical or phase conjugate plane-wave reference beam to reconstruct the data beam and recover the stored data.

Holographic media incorporating photopolymers show great potential for commercial use due to their large index contrast, high photosensitivity and low cost. One potential drawback with these materials is that their coefficient of thermal expansion and their index of refraction may change with temperature such that, in many holographic system designs, normal temperature changes may result in difficulty in recovering an entire data page using a single exposure.

Further, in holographic storage systems the tolerance of the reference beam's orientation may be inversely related to the thickness of the holographic medium. Because it is often desirable to use a holographic storage medium to store large amounts of data, it must be correspondingly thick, and there may be little tolerance in the reference beam's orientation. Additionally, in a commercial holographic storage system, the holographic medium will be regularly removed and replaced in the system, potentially resulting in angular errors in the direction and azimuth of the reference beam orientation. Angular misalignments due to rotation or tilt of the holographic medium make it difficult to recover an entire data page without compensating for the misalignment. Further, due at least in part to the thickness of a typical holographic storage medium, angular misalignments of less than 1 degree may render it difficult, if not impossible, to recover a data page in a single exposure in holographic storage systems.

Accordingly, there is a need for methods and systems for compensating for temperature and/or alignment changes in holographic storage systems.

SUMMARY

According to a first broad aspect of the present invention, there is provided a method comprising the following steps:
(a) directing a reference beam into a holographic storage medium to generate a recovered holographic image;
(b) changing an orientation of the reference beam;
(c) monitoring, for a plurality of reference beam orientations, an intensity of at least two regions of the recovered holographic image;
(c) determining for each monitored region of the recovered holographic image the reference beam orientation at which the monitored intensity of the region is a maximum; and
(d) determining, based on a difference between the determined reference beam orientations where the intensity was a maximum, at least one of the following: a tuned wavelength for the reference beam, a tilt angle for the storage medium, or a rotation angle for the storage medium.

According to a second broad aspect of the invention, there is provided a system for use with a storage medium that holographically stores information, the system comprising:
a light source which generates a light beam that is a reproduction of a reference beam used in storing information in the storage medium;
an optical steering subsystem for directing the light beam to the storage medium;
at least one detector for determining an intensity level of a first subset of one or more pixels of a data page and an intensity level of a second subset of one or more pixels of the data page;
a processor to control the optical steering subsystem to direct a reference beam into the storage medium to generate a recovered holographic image; direct the optical steering subsystem to change an orientation of the reference beam; to monitor, for a plurality of reference beam orientations, an intensity detected by the at least one detector for at least two regions of the recovered holographic image; to determine for each monitored region of the recovered holographic image, the reference beam orientation at which the monitored intensity of the region is a maximum, and to determine, based on the difference between the determined reference beam orientations, at least one of the following: a tuned wavelength for the reference beam, a tilt angle for the storage medium, or a rotation angle for the storage medium.

According to a third broad aspect of the invention, there is provided a system comprising:
means for directing a reference beam into a holographic storage medium to generate a recovered holographic image;
means for changing an orientation of the reference beam;
means for monitoring, for a plurality of reference beam orientations, an intensity of at least two regions of the recovered holographic image;
means for determining for each monitored region of the recovered holographic image, the reference beam orientation at which the monitored intensity of the region is a maximum; and
means for determining, based on the difference between the determined reference beam orientations, at least one of the following: a tuned wavelength for the reference beam, a tilt angle for the storage medium, or a rotation angle for the holographic storage medium.

BRIEF DESCRIPTION OF THE DRAWINGS

The invention will be described in conjunction with the accompanying drawings, in which.

DETAILED DESCRIPTION

Figure 1:
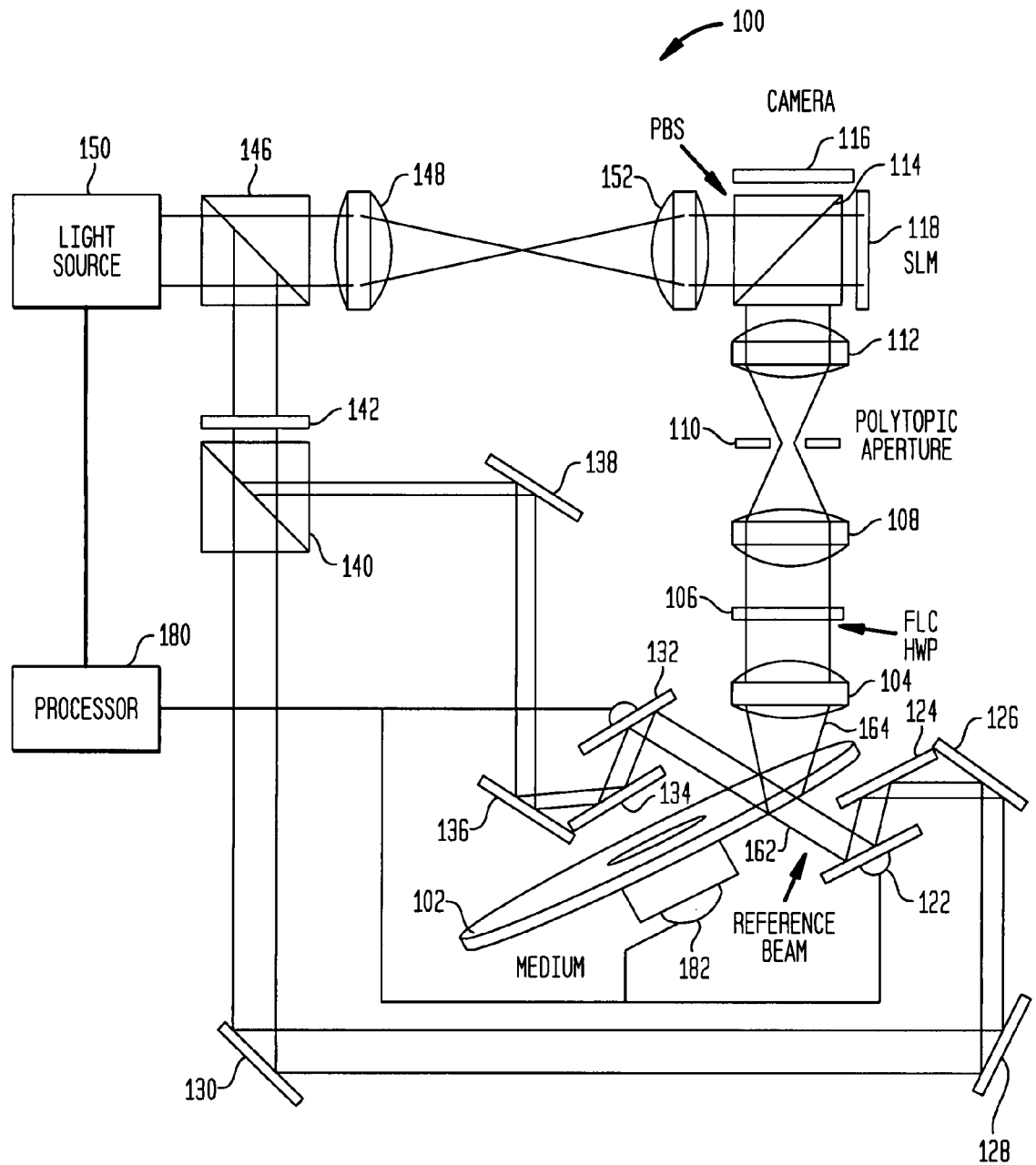
FIG. 1 illustrates a simplified schematic diagram of an exemplary holographic storage system, in accordance with embodiments of the invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "light source" refers to a source of electromagnetic radiation having a single wavelength or multiple wavelengths. The light source may be from a laser, one or more light emitting diodes (LEDs), etc.

For the purposes of the present invention, the term "data page" or "page" refers to the conventional meaning of data page as used with respect to holography. For example, a data page may be a page of data, one or more pictures, etc., to be stored or recorded in a holographic medium.

For the purposes of the present invention, the term "coherent light beam" refers to a beam of light including waves with a particular (e.g., constant) phase relationship, such as, for example, a laser beam.

For the purposes of the present invention, the term "processor" refers to a device capable of, for example, executing instructions, implementing logic, calculating and storing values, etc. Exemplary processors may include application specific integrated circuits (ASIC), central processing units, microprocessors, such as, for example, microprocessors commercially available from Intel and AMD, etc.

For the purpose of the present invention, the term "plane wave" refers to a constant-frequency wave whose wavefronts (surfaces of constant phase) are parallel planes of constant amplitude and normal to the direction of the wave and exist in a localized region of space. Exemplary plane waves may include collimated light such as those associated with laser beams for laser pointers, etc.

For the purpose of the present invention, the term "tune" refers to adjusting a device to a desired state. For example, in exemplary embodiments, a light source may be tuned by adjusting the particular wavelength of light output by the light source.

For the purposes of the present invention, the term "holographic storage medium" refers to a component, material, etc., that is capable of recording and storing, in three dimensions (i.e., the X, Y and Z dimensions), one or more holograms (e.g., bit-wise, linear array-wise or page-wise) as one or more patterns of varying refractive index imprinted into the medium. Examples of a holographic medium useful herein include, but are not limited to, those described in: U.S. Pat. No. 6,103,454 (Dhar et al.), issued Aug. 15, 2000; U.S. Pat. No. 6,482,551 (Dhar et al.), issued Nov. 19, 2002; U.S. Pat. No. 6,650,447 (Curtis et al.), issued Nov. 18, 2003, U.S. Pat. No. 6,743,552 (Setthachayanon et al.), issued Jun. 1, 2004; U.S. Pat. No. 6,765,061 (Dhar et al.), Jul. 20, 2004; U.S. Pat. No. 6,780,546 (Trentler et al.), issued Aug. 24, 2004; U.S. Patent Application No. 2003-0206320 (Cole et al.) published Nov. 6, 2003; and U.S. Patent Application No. 2004-0027625 (Trentler et al.), published Feb. 12, 2004, the entire contents and disclosures of which are herein incorporated by reference.

For the purposes of the present invention, the term "storage medium" refers to any component, material, etc., capable of storing information, such as, for example a holographic storage medium.

For the purposes of the present invention, the term "reference beam" refers to a beam of light not modulated with data. Exemplary reference beams include non-data bearing laser beams used while recording data to, or reading data from a holographic storage medium.

For the purposes of the present invention, the term "spatial light modulator" refers to a device that stores information on a light beam by, for example, modulating the spatial intensity and/or phase profile of the light beam.

For the purposes of the present invention, the term "data beam" refers to a beam containing a data signal. For example, the term data beam includes beams that have been modulated by a modulator such as a spatial light modulator (SLM), along with a beam generated in response to a reference beam impingent on a holographic storage medium, where the generated beam includes data.

For the purposes of the present invention, the term "detector" refers to any type of device capable of detecting something. For example, exemplary detectors may include devices capable of detecting the presence or intensity of light, such as for example, a camera or quad cell.

For the purposes of the present invention, the term "optical steering subsystem" refers to any device or combination of devices capable of directing light in a particular direction. Exemplary optical steering subsystems may include a mirror (e.g., a galvo mirror), a combination of mirrors, lenses, and/or other devices, etc.

Description

FIG. 1 illustrates a simplified diagram of an exemplary holographic memory system 100 in accordance with embodiments of the invention. For purposes of simplification, only a subset of the components of holographic memory system 100 are illustrated, and in actual implementation, holographic memory system 100 may include numerous additional or alternative components, such as, for example, additional light sources, mirrors, additional beam splitters, etc. For example, holographic memory system 100 may be employed in a holographic memory system such as disclosed in U.S. patent application Ser. No. 11/440,370 entitled "Illuminative Treatment of Holographic Media" filed May 25, 2006, the entire disclosure and contents of which is hereby incorporated by reference. It should be noted that exemplary holographic memory system 100 is but one exemplary system in which methods and systems consistent with the invention may be used, and methods and systems consistent with invention may be used in other systems, such as, for example, in any holographic system that utilizes a plane wave reference beam and where the stored page is non-telecentric in the holographic medium.

As illustrated in FIG. 1, a holographic memory system 100 may include a holographic storage medium 102, an objective lens 104, a half-wave plate (HWP) 106, another lens 108, a polytopic aperture 110, another lens 112, a polarizing beam splitter (PBS) 114, a camera 116, a spatial light modulator (SLM) 118, a plurality of mirrors 122, 124, 126, 128, 130, 132, 134, 136, and 138, another PBS 140, another HWP 142, another PBS 146, another pair of lenses 148 and 152, a light source 150, a processor 180, and an adjusting device 182. The processor 180 may be, for example, a commercially available microprocessor. Further, mirrors 122 and 132 may be, for example, galvo mirrors capable of being adjusted by processor 180. Additionally, adjusting device 182 may comprise one or more motors capable of adjusting the rotation and alignment of storage medium 102 under the control of, for example, processor 180. The lenses (104, 108, 112, 148, and 152) may be, for example, any type of lens, such as those commercially available. Exemplary lenses may include, for example, high numerical aperture (N.A.) aspheric storage lenses. Additionally, the combination of lens 110, polytopic aperture 112, and lens 114 may be referred to as a "4F relay." Storage medium 102 may comprise a photopolymer in which a fringe pattern may be stored as will be described in more detail below. Further, this photopolymer may be positioned between or encased by a pair of substrates. Storage media comprising photopolymers positioned between or encased by a pair of substrates are well known to those skilled in the art and therefore are not described further herein. A further description of exemplary methods and system for adjusting the alignment and rotation of storage device 102 is presented below.

When writing data to storage medium 102, coherent light from light source 150 is directed towards PBS 146. The polarization of this coherent light during a data write may be such that the coherent light passes through PBS 146, lenses 148 and 152, and PBS 114, where the coherent light is encoded by SLM 118. SLM 118 may, for example, encode a page of data using the phase and/or amplitude of the coherent light beam. Data encoding via an SLM is well known to those skilled in the art and accordingly is not described further herein.

Figure 2:
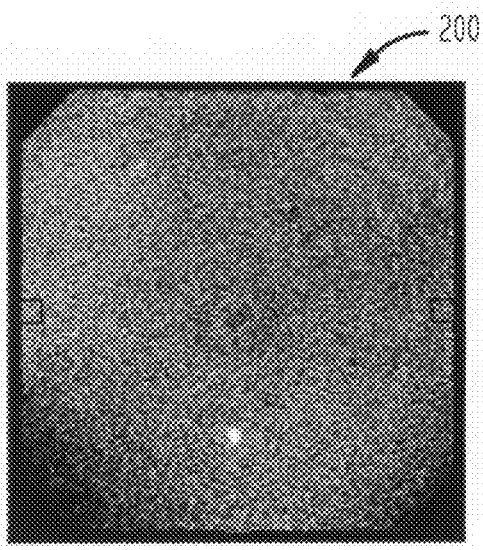
FIG. 2 illustrates an exemplary image of a data page, in accordance with embodiments of the invention.

The encoded light (i.e., the coherent light beam after being modulated with a page of digital data by SLM 118) may then be directed by PBS 114 towards holographic storage medium 102 via lens 112, polytopic aperture 110, lens 108, HWP 106, and lens 104. Additionally, a portion of the coherent light generated by light source 150 may be directed by PBS 146 towards PBS 140 via HWP 142. During a data write operation PBS 140 directs the coherent light towards mirror 138. The coherent light from mirror 138 may then directed by mirrors 136, 134, and 132 towards storage medium 102. In the write operational mode (i.e., a data write) the coherent light beams directed by lens 104 (i.e., encoded with data by SLM 118) and by mirror 132 (often referred to as a write reference beam) interfere to create an interference pattern in storage medium 102. The interference pattern induces material alterations in storage medium 102 to form a hologram, as is well-known to those skilled in the art. This image recorded in storage medium 102 (i.e., the SLM encoded data image) is often referred to as a data page. FIG. 2 provides an image of an exemplary data page 200. Further, the interference pattern stored by storage medium 102 is also often referred to as a fringe pattern or grating, and these terms will thus be used interchangeably herein.

Holographically-stored data may retrieved from the holographic storage medium 102 by performing a read (or reconstruction) of the stored data. The read operation may be performed by projecting a reference beam 162 (see FIG. 1, also referred to as a probe beam) onto or into the storage medium 102 at the same angle, wavelength, phase, position, etc., as the reference beam used to record the data (i.e., the write reference beam), or compensated equivalents thereof. The direction of propagation of this reference beam can be the same as the write reference beam (normal recovery) or the reverse of the write reference beam (phase conjugate recovery). Reference beam 162 may be generated by light source 150, and due to its polarization, travel a path via PBS 146, HWP 142, PBS 140 and mirrors 130, 128, 126, 124 and 122, where one or more mirrors (e.g., mirror 122) are adjusted by processor 180 so that reference beam 162 is projected into the storage medium 102 at the appropriate angle.

The hologram (i.e., the fringe pattern stored in the storage medium 120) and reference beam 162 interact to reconstruct the data beam. The reconstructed data beam 164 may then pass through lens 104, HWP 106, lens 108, polytopic aperture 110, and lens 112 after which it passes into PBS 114. PBS 114 then passes the reconstructed data beam 164 to camera 116 where an image of the reconstructed data beam may be captured. This image may then be processed to retrieve the stored data.

Figure 3A:
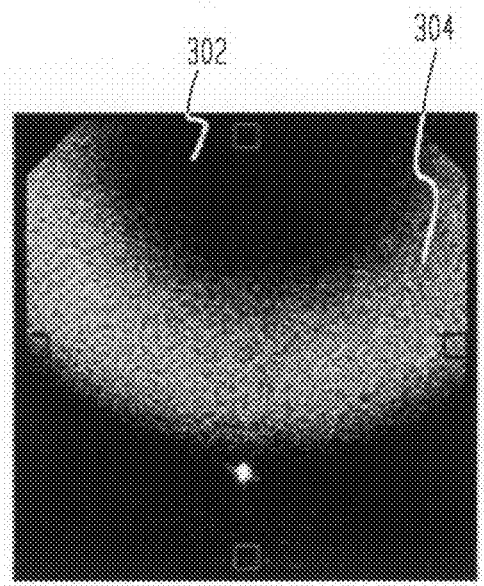
FIG. 3A illustrates an exemplary image of a data page in which the wavelength is not properly tuned.
Figure 3B:
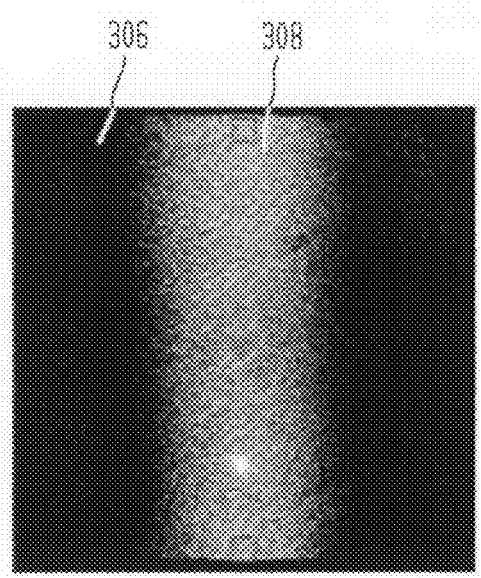
FIG. 3B illustrates an exemplary image in which there are misalignments of a holographic storage medium.

As noted above, temperature effects or alignment errors with storage medium 102, without compensation, may make it difficult to recover a data page in a single exposure. The following provides an exemplary description of embodiments of methods and systems for compensating for such temperature effects and alignment errors with storage medium 102. FIGS. 3A and 3B illustrate recovered images captured by camera 116 in which the storage medium 102 is misaligned or the wavelength of the read reference beam is detuned. As illustrated, the environmental effects result in only a narrow band (304 and 308) being reconstructed on camera 116 with a given reference beam orientation. The orientation, thickness, and shape of this band is dependent on the geometry of the holographic system, the medium thickness, the medium misalignment and the environmental conditions. As the reference beam orientation changes, the band (304, 308) of recovered pixels will move on the data page in a manner dependent on the type of misalignment and the system geometry. For example, as the reference beam orientation changes, the band (304, 308) may move from top to bottom, left to right, etc.

For example, FIG. 3A illustrates an exemplary image 302 of a data page in which the wavelength is not properly tuned. The resulting narrow band 304 in this example will move up and down as the angle of the reference beam 162 on storage medium 102 changes. FIG. 3B illustrates an exemplary image 306 in which there are media misalignments (e.g., the storage medium 102 is not properly aligned). In this example, the narrow band 308 will move from side to side as the reference beam angle is varied.

In an embodiment, the above-noted characteristic of the band moving based on changes in the reference beam orientation is harnessed to determine information regarding the detuning of the reference beam and alignment errors with the storage medium 102. For example, by varying the orientation of the reference beam and measuring the position of the band of recovered data pixels using the techniques described herein, the medium misalignment and wavelength detuning of the system geometry may be determined. As will be described in more detail below, this may be accomplished by scanning the reference beam angle in one direction while monitoring the intensity of small regions of a single recovered data page or alternatively monitoring discrete sensors placed in the data beam. The reference beam orientations that correspond to a maximum intensity for these different regions (or sensors) may be then used to calculate the changes to the medium orientation and reference beam wavelength that may be used to compensate for these environmental effects.

Once the medium misalignment and reference beam wavelength detuning is calculated and stored, storage system 100 may be correspondingly adjusted and these changes to the wavelength of the reference beam 162 and the alignment of storage medium 102 may be used to recover every data page stored by storage medium 102. That is, for example, when a storage medium 102 is placed in storage system 100, the adjusted wavelength of the reference beam 162 and the changes in the alignment of storage medium 102 may first be determined and these changes used by processor 180 to effect these changes in the alignment of storage medium 102 (e.g., by directing adjusting device 182 to effect corresponding alignment changes) and the tuning of reference beam 162 (e.g., by adjusting light source 150 to the desired wavelength). After these changes are effected, storage system 100 may recover all other data pages stored by storage medium 102. Further, in an embodiment, processor 180 may monitor the recovered data and re-determine the wavelength tuning and alignment adjustments if, for example, the Signal to Noise Ratio (SNR) of the recovered data drops below a threshold due to temperature changes, medium shifts, or other environmental factors.

The following provides an explanation of the theory behind the techniques described herein for compensating for environmental effects on storage medium 102. Exemplary embodiments of methods and systems for using the described theory for compensating for environmental effects with the storage medium 102 are provided thereafter.

The recording of holograms in a storage medium may be analyzed by decomposing the interfering fields into their respective angular spectrum of plane waves and projecting the result onto the surface of the momentum or Ewald sphere (also known as the k-sphere formulation). Plane waves, represented in momentum space as delta functions on the surface of a k-sphere with radius $2\pi n/\lambda$, where n is the index of refraction and $\lambda$ the wavelength of the reference beam, write a periodic index modulation in the holographic medium that to the first order is proportional to the intensity of their interference pattern. For two interfering plane waves propagating with vectors $\vec{k}_A$ and $\vec{k}_B$, this is a plane wave modulated with a sinc angular spectrum due to the finite thickness of the recording medium.

Temperature changes may affect stored holograms in two ways. First, there may be a change in the dimensions of the photopolymer (i.e., the storage medium) and the fringe pattern stored therein due to the coefficient of thermal expansion (CTE) of the holographic medium (i.e., the photopolymer of the storage medium). This change may be anisotropic due, for example, to the differences in CTE between the recording material (i.e., the photopolymer) and the substrates. Anisotropic expansion causes the grating vector, $K_G$, (i.e., the vector of the fringe pattern) to rotate and shrink as the medium expands. The second effect of temperature change is an alteration in the bulk index of refraction of the photopolymer. This effect does not change the grating vectors, but instead increases (or decreases) the size of the momentum sphere on hologram reconstruction. The combination of these two effects may change both the optimum angle of the reference beam for recovering the hologram and the angle of the recovered plane wave. In addition to these temperature effects, medium misalignment also affects the desired angle of the reference beam for recovering the hologram as the grating vectors rotate with the medium while the reference beam does not.

These modifications of the grating vectors due to environmental effects may, without compensation, have a significant impact on hologram recovery in storage systems that are non-telecentric in the storage medium. As noted above, in page-based holographic storage systems, a spatial light modulator (SLM) may be used to encode data on a coherent beam of light. Holographic systems that are non-telecentric in the storage medium are characterized by the fact that the chief rays (e.g., the chief rays of the data pixels in this example) are either converging or diverging in the recording medium.

In examining the environmental effects on storage system 100, it is helpful examine the system's geometry, which may be simplified by only examining the fundamental plane wave of each data pixel (characterized by its chief ray). With this simplification, it may be shown that changes to the holographic gratings (e.g., fringes in the storage medium 102) and k-sphere radius due to variations in temperature make it difficult to Bragg match multiple pixels simultaneously without compensation.

Figure 4:
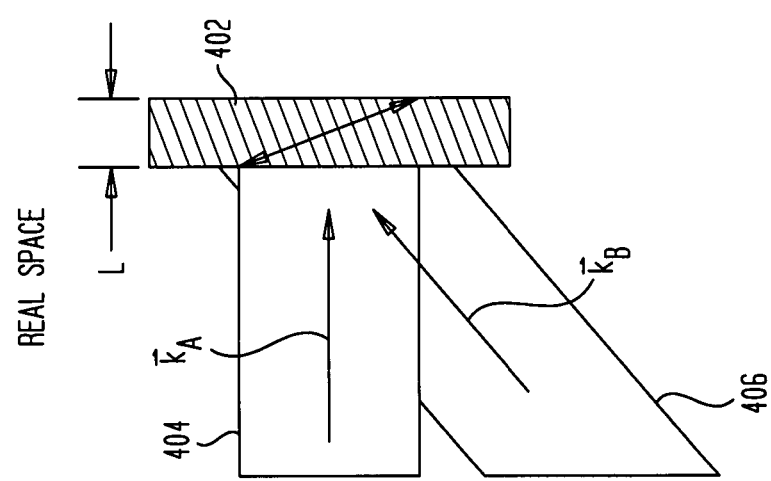
FIG. 4 illustrates the interference of two plane waves creating a periodic modulation in the index of refraction of a holographic storage medium, in accordance with embodiments of the invention.

Referring back to FIG. 1, the exemplary storage system 100 uses a Fourier plane geometry where a data page created by a spatial light modulator (SLM) is Fourier transformed using lenses and the resultant field is stored in the storage medium 102 by interfering it with a reference plane wave. FIG. 4 illustrates a simplified diagram of an SLM modulated data pixel 404 with a fundamental plane wave propagation vector, $\vec{k}_A$, for an SLM pixel and a write reference beam 406 with a propagation vector, $\vec{k}_B$, interfering in a storage medium 402, such as storage medium 102 of FIG. 1. It should be noted that FIG. 4 is a simplified diagram provided for explaining how optical propagation vectors may be plotted on a k-sphere, and as such only illustrates the propagation vector, $\vec{k}_A$, for a single pixel of the SLM. In actual implementation the SLM may comprise numerous pixels each of which will have their own individual propagation vector.

Figure 6:
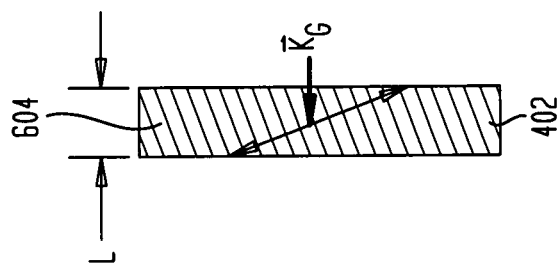
FIG. 6 illustrates the resulting fringe pattern stored in a holographic storage medium and its associated grating vector, in accordance with embodiments of the invention.
Figure 5:
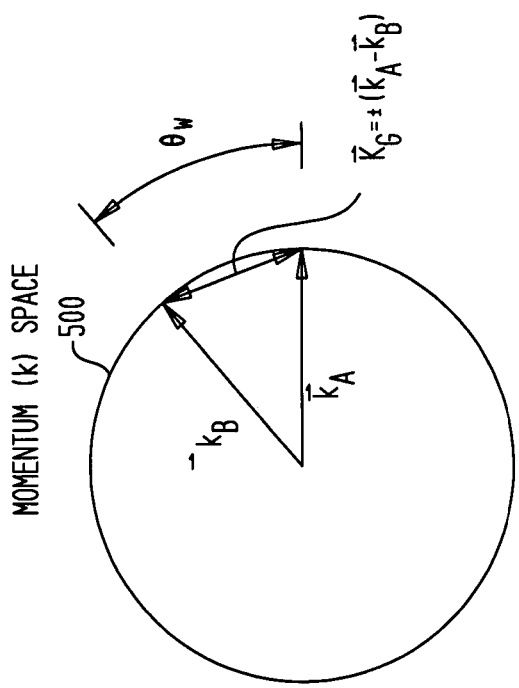
FIG. 5 illustrates the two plane wave propagation vectors, $\vec{k}_A$ and $\vec{k}_B$, plotted on the momentum or k-sphere, in accordance with embodiments of the invention.

FIG. 5 illustrates the two propagation vectors, $\vec{k}_A$ and $\vec{k}_B$, plotted on a k-sphere 500, where the write reference beam has an angle, $\theta_W$. FIG. 6 illustrates the resulting fringe pattern 604 and its corresponding vector, $\vec{K}_G$, (referred to herein as the grating vector) stored in storage medium 402.

Figure 8:
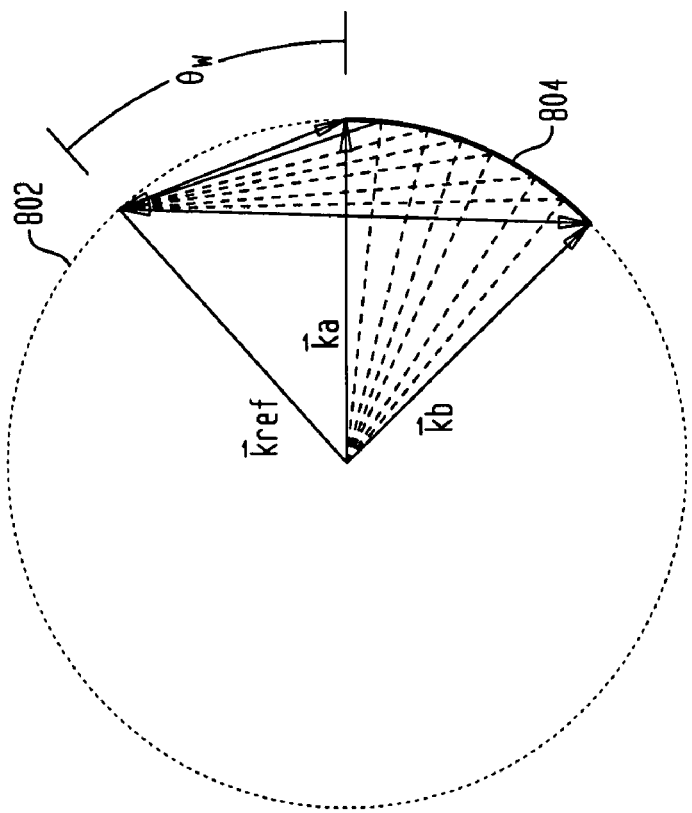
FIG. 8 illustrates propagation vectors plotted on a k-sphere, in accordance with embodiments of the invention.
Figure 7:
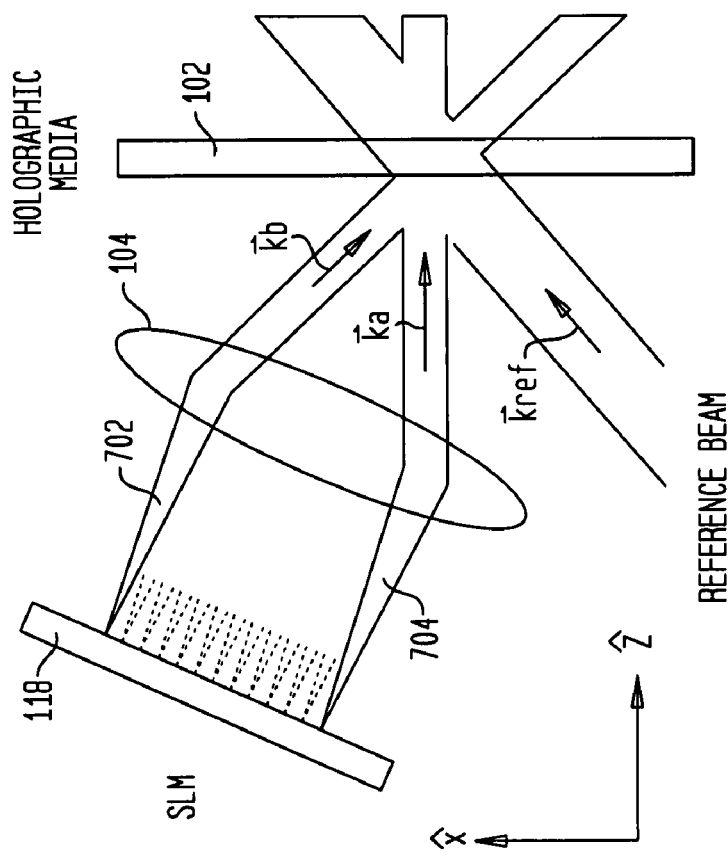
FIG. 7 illustrates data beams corresponding to two pixels, in accordance with embodiments of the invention.

FIG. 7 illustrates the data beams corresponding to two pixels. This diagram is a simplified version of FIG. 1 for illustrative purposes and illustrates light beams 702 and 704 emanating from pixels on opposite sides of SLM 118. It should be noted that in actual implementation light beams will emanate from multiple additional pixels, but for explanatory purposes only the beams from these two pixels are illustrated. Each of these light beams 702 and 704 has a corresponding propagation vector, $\vec{k}_a$ and $\vec{k}_b$, respectively. FIG. 8 illustrates these propagation vectors plotted on a momentum sphere 802. In operation when pixels throughout SLM 118 are used and their corresponding vectors plotted on k-sphere 802, they will be plotted on a portion 804 of k-sphere 802.

Figure 11:
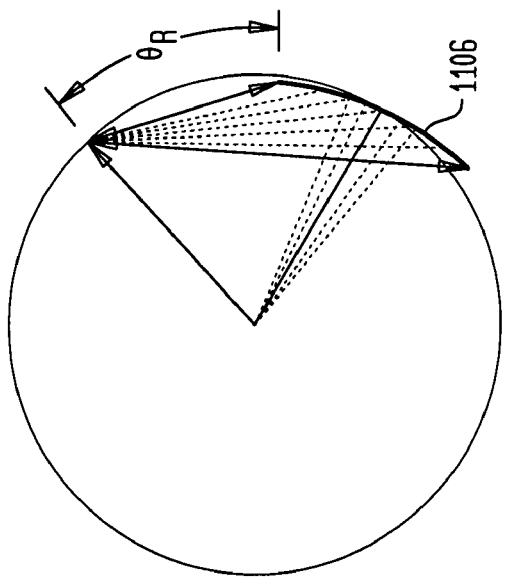
FIG. 11 provides a k-sphere representation illustrating the temperature effects on data recovery for a full data page.
Figure 10:
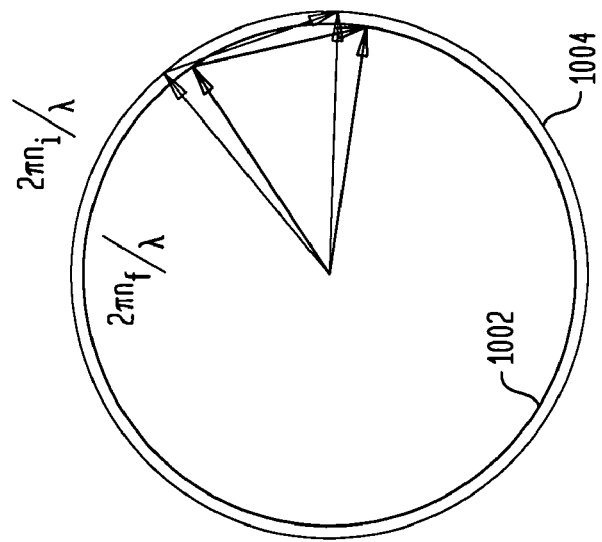
FIG. 10 provides a k-sphere representation illustrating the temperature effects on a holographic storage medium.
Figure 9:
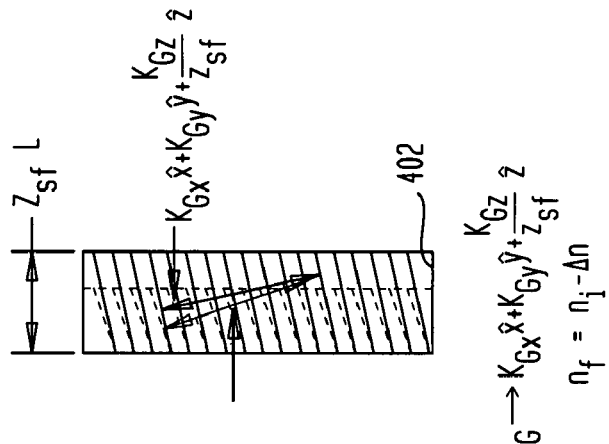
FIG. 9 illustrates a holographic storage medium where a temperature change has resulted in anisotropic expansion of a holographic storage medium and a change in the medium bulk index of refraction.

A temperature change in storage medium 402 may result in a change in the grating vector, $\vec{K}_G$. For example, FIG. 9 illustrates storage medium 402 where a temperature change has resulted in expansion of the storage medium from a thickness, L, to an expanded thickness, $z_{sf}L$. In this example, the size of the media in the x and y dimensions is unchanged. This expansion results in a change in the fringe pattern stored in storage medium 402 and correspondingly a change in the grating vector from $$\vec{K}_G \text{ to } K_{Gx}\hat{x} + K_{Gy}\hat{y} + \frac{K_{Gz}}{z_{sf}}\hat{z}$$

where $K_{Gx}$, $K_{Gy}$, and $K_{Gz}$ are the original, unchanged components of the grating vector. Further, as noted above, in k-space, the radius of the k-sphere is $2\pi n/\lambda$, where n is the index of refraction and $\lambda$ is the wavelength of the light. In addition to a change in the size of the storage medium, a temperature change in the storage medium may also change the storage medium's index of refraction, n, which accordingly results in a change in the diameter of the k-sphere. FIG. 10 illustrates a k-sphere 1002 for purposes of illustrating the temperature effects on the storage medium where the index of refraction has decreased from the initial index of refraction, $n_i$, (k-sphere 1004) to a final index of refraction, $n_f$ (k-sphere 1002). FIG. 11 illustrates the effects of these temperature effects on data recovery if the same wavelength used to write the data is also used to read the data. As can be seen by curve 1106, with a full data page, the fraction of the grating manifold that Bragg matches, i.e. intersects with the k-sphere, will form a narrow band on the recovered image. In FIG. 11, $\theta_R$ is the angle of the read reference beam 162 incident on storage medium 102. Changing the wavelength, and thus the size of the k-sphere, during hologram recovery may compensate for this condition by matching the curvature of the manifold of grating vectors to curvature of the k-sphere.

Because of the angular spectrum of a grating vector, the hologram diffraction efficiency as a function of reference beam orientation will be proportional to $\text{sinc}^2(z_{SF}L\Delta \vec{k}_z/2\pi)$, where $z_{SF}L$ is the thickness of the holographic medium during hologram recovery, $\text{sinc}(x) = \sin(\pi x)/\pi x$, and $\Delta \vec{k}_z$ is the distance between the momentum sphere and the sum of the reference beam propagation vector and the grating vector in the direction perpendicular to the medium. Thus, the grating will be Bragg matched and the intensity of the recovered pixel hologram will be maximum when $\Delta \vec{k}_z = 0$. To find $\Delta \vec{k}_z$, it is noted that the grating vector, $\vec{K}_{m,n}$, for SLM pixel (m,n) may be found by:

$$\vec{K}_{m,n} = \pm \begin{bmatrix} 1 & 0 & 0 \\ 0 & \cos\delta & -\sin\delta \\ 0 & \sin\delta & \cos\delta \end{bmatrix} \begin{bmatrix} \cos\phi & \sin\phi & 0 \\ -\sin\phi & \cos\phi & 0 \\ 0 & 0 & 1 \end{bmatrix} \begin{bmatrix} 1/x_{SF} & 0 & 0 \\ 0 & 1/y_{SF} & 0 \\ 0 & 0 & 1/z_{SF} \end{bmatrix}$$

$$(\vec{k}_W - \vec{k}_{m,n})$$

In the equation above, $\vec{k}_W$ is the propagation vector of the writing reference beam. $\vec{k}_{m,n}$ is the propagation vector of the pixel fundamental plane wave (collinear to the pixel chief ray and with magnitude $2\pi n/\lambda$). The constants $x_{SF}$, $y_{SF}$, and $z_{SF}$ are the medium shrinkage factors in the $\hat{x}$, $\hat{y}$ and $\hat{z}$ directions associated with temperature changes or post recording medium cure. The angle $\phi$ characterizes medium rotation about the medium normal. The angle $\delta$ characterizes the medium tilt about the $\hat{x}$ axis. Finally, the ± corresponds to the + and − orders of the hologram diffraction.

Figure 12:
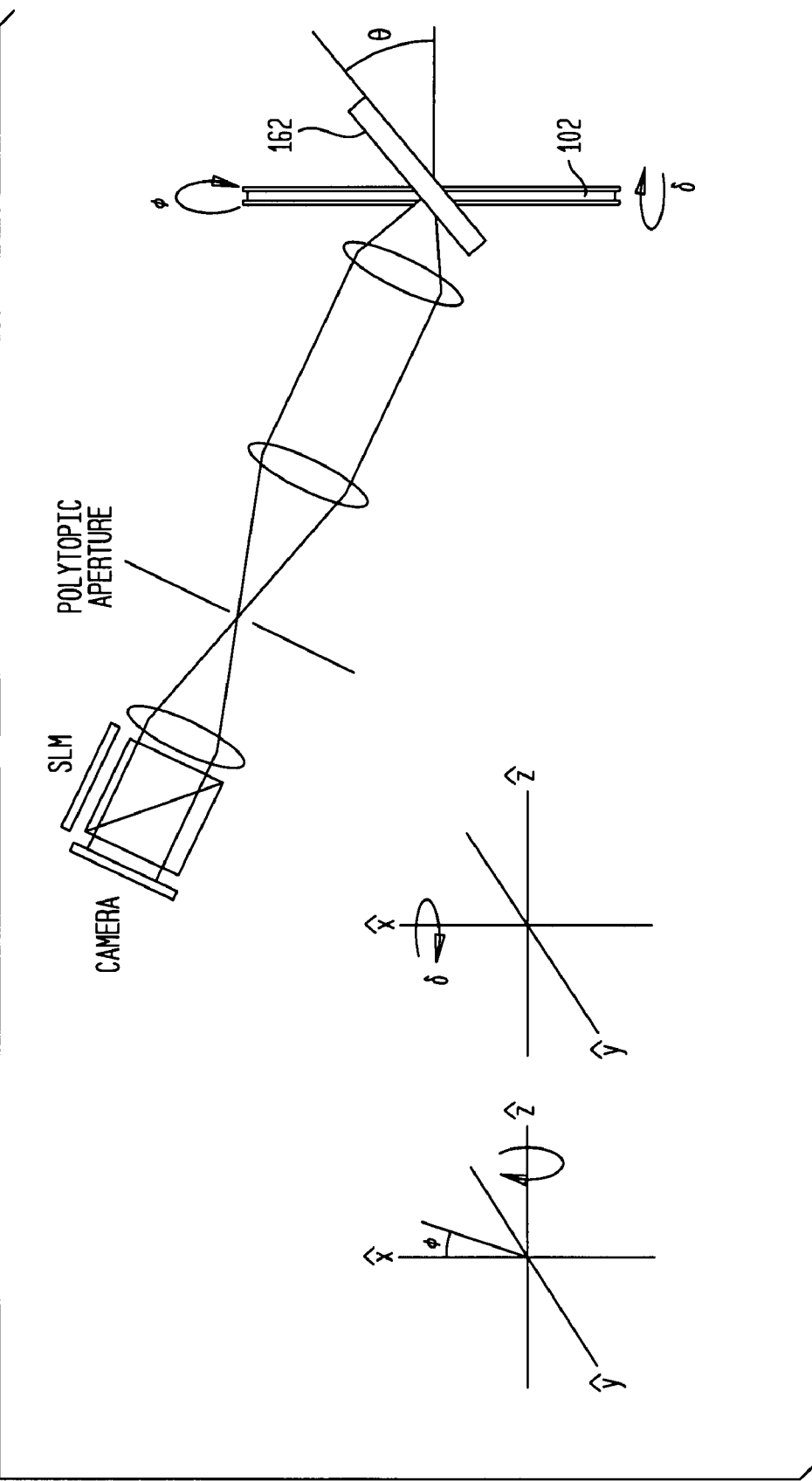
FIG. 12 illustrates a simplified diagram of an exemplary holographic storage system, in accordance with embodiments of the invention.

FIG. 12 provides a simplified diagram of storage system for the purposes of illustrating the various angles discussed herein. As illustrated, reference beam 162 is incident on storage medium 102 at an angle, θ. Also, as illustrated, the storage medium 102 may be rotated by angle φ and tilted by angle δ. As noted, these various angles may be adjusted in the storage system 100 by adjusting device 182.

Defining the coordinate system so that $\hat{z}$ is the medium normal and the read reference beam is scanned in the $\hat{x}$-$\hat{z}$ plane for simplicity, $\Delta \vec{k}_z = 0$ can be solved for the orientation of the reference beam needed to Bragg match the pixel vector. Expanding $\Delta \vec{k}_z$:

$$\Delta \vec{k} \cdot \hat{z} = \left| \left( \vec{k}_R + \vec{K}_{m,n} \right) \cdot \hat{z} \right| - \sqrt{\left| \vec{k}_R \right|^2 - \left( \left( \vec{k}_R + \vec{K}_{m,n} \right) \cdot \hat{x} \right)^2 - \left( \left( \vec{k}_R + \vec{K}_{m,n} \right) \cdot \hat{y} \right)^2} = 0$$

where $\vec{k}_R$ is the propagation vector of the read reference beam. This equation can be solved for θ, the angle in the x-z plane where the intensity of the recovered data pixel is a maximum. Referencing the above equation for $\vec{K}_{m,n}$, and noting that the magnitude of $\vec{k}_R$ is $2\pi n/\lambda$, it is evident that the solution will depend on the system geometry, the medium rotation, the medium tilt, and the difference between the optimal wavelength and the reading wavelength $\Delta\lambda$.

Using the solution of the above equation for $\Delta \vec{k}_z$ for two different SLM pixels, and measuring the difference in reference beam orientations needed to Bragg match the corresponding separate regions of a data page, it is possible to determine the optimum amount of wavelength detuning and medium misalignment.

To demonstrate this, the above-discussed system shown in FIGS. 4-12 is used. Using the coordinate system shown and a SLM with M rows and N columns, two pixel grating vectors on the equator of the k-sphere corresponding to pixels (1,N/2) and (MN/2) may be calculated using the pixel chief rays and a reference beam propagating in the $\hat{x}$-$\hat{z}$ plane with an angle $\theta_W$ from the $\hat{z}$ axis. These gratings may then be modified due to temperature changes and shrinkage of the photopolymer during post-recording medium cure, such as illustrated in FIGS. 8-12. The modifications have the effect that only a narrow band of pixels will Bragg match with a given read reference beam angle. Using the solution for the angle θ where the intensity of the two pixels is maximum, the difference in reference beam angles, Δθ, needed to match the two pixels may be given by:

$$\Delta\theta(\Delta\lambda,\phi,\delta) = \theta_{M,N/2}(\Delta\lambda,\phi,\delta) - \theta_{1,N/2}(\Delta\lambda,\phi,\delta)$$

Figure 13:
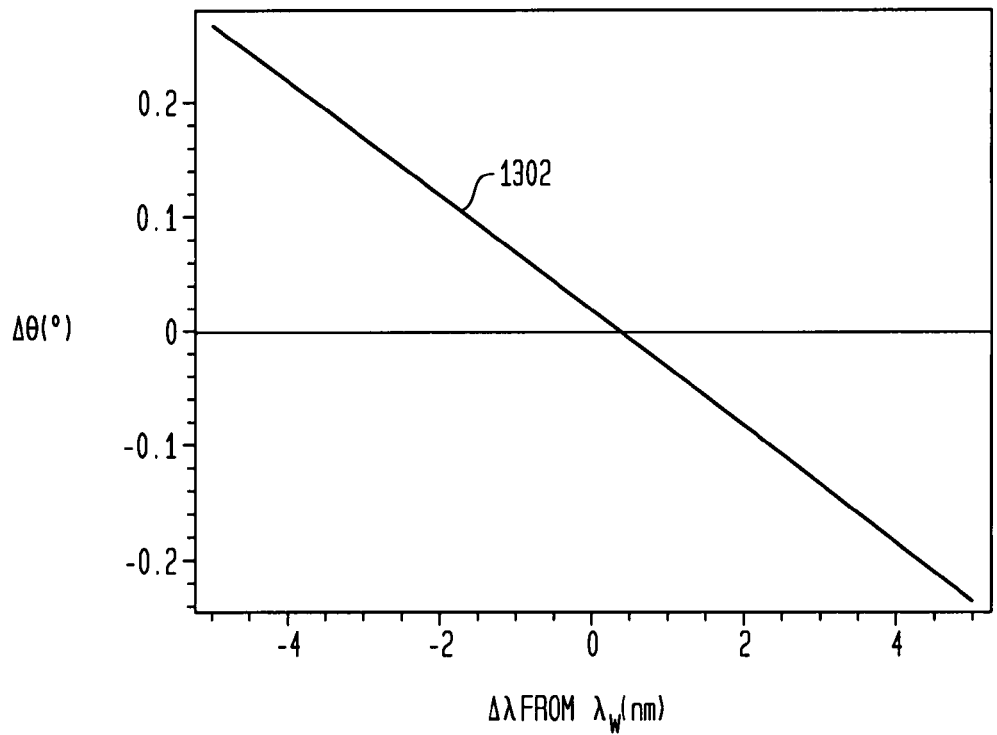
FIG. 13 provides an exemplary curve illustrating the difference in reference beam angles for Bragg matching different pixel subsets or page regions versus wavelength detuning, in accordance with embodiments of the invention.

For a hologram recovered from a properly aligned holographic medium using the correctly tuned wavelength, this equation should be equal to 0. It is also possible to choose the pixels such that the function $\Delta\theta(\Delta\lambda,\phi,\delta)$ is only a function of the wavelength detuning $\Delta\lambda$. Plotting this equation for the exemplary system in FIG. 1 shows how the separation in reference beam angles to Bragg match the two pixels varies as a function of the detuning from the writing wavelength. FIG. 13 illustrates an exemplary $\Delta\theta(\Delta\lambda)$ curve 1302 determined using the solution to the above equation for $\Delta k_z$. For a given hologram, the slope of this curve, $d\Delta\theta/d\Delta\lambda$, is independent of wavelength and is insensitive to changes in temperature, disk rotation, and disk tilt. Thus, the optimum wavelength to recover a data page may be determined by measuring the difference in reference beam angles needed to Bragg match the two regions of the recovered data page and dividing by the slope of the function determined by solving above equations and illustrated in FIG. 13. This curve may be determined for a given storage system geometry, for example, such as 100 and stored for later use.

Figure 14:
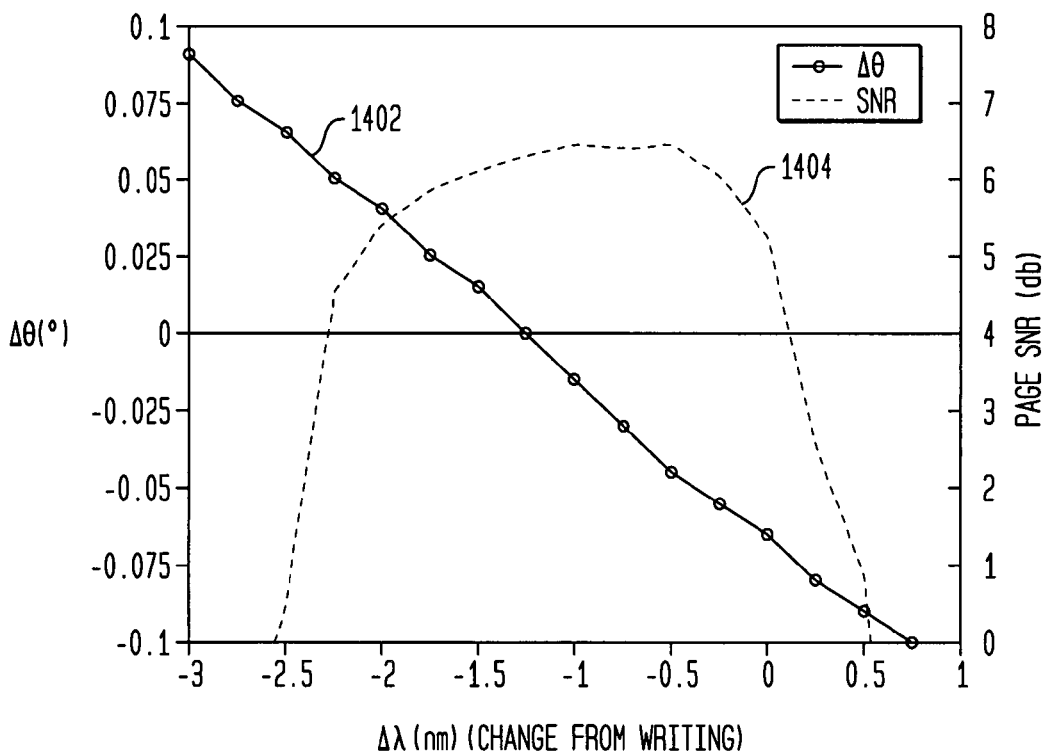
FIG. 14 illustrates an exemplary curve illustrating the difference in reference beam angles for Bragg matching different pixel subsets or page regions versus wavelength detuning determined experimentally along with a corresponding SNR curve for a data hologram, in accordance with embodiments of the invention.

FIG. 14 illustrates an exemplary $\Delta\theta(\Delta\lambda)$ curve 1402 obtained experimentally along with a corresponding SNR curve 1404 for a single 752×752 data hologram with a 12 μm pitch written at room temperature with a wavelength of 405 nm and a lens focal length of 13.81 mm. The medium in this example is cured, heated to 8° C., and then recovered while scanning the laser wavelength and monitoring the Bragg matching angle difference for two 64×64 pixels regions centered on the pixels (40,376) and (712,376). The y intercept for the $\Delta\theta(\Delta\lambda)$ curve accurately tracks the centroid of the SNR peak for the hologram and the given temperature increase. As can be seen, the slope of the $\Delta\theta(\Delta\lambda)$ curve 1402, $d\Delta\theta/d\Delta\lambda$, obtained via these experimental results matches the slope predicted by the equation above and illustrated by curve 1302 of FIG. 13.

Figure 15:
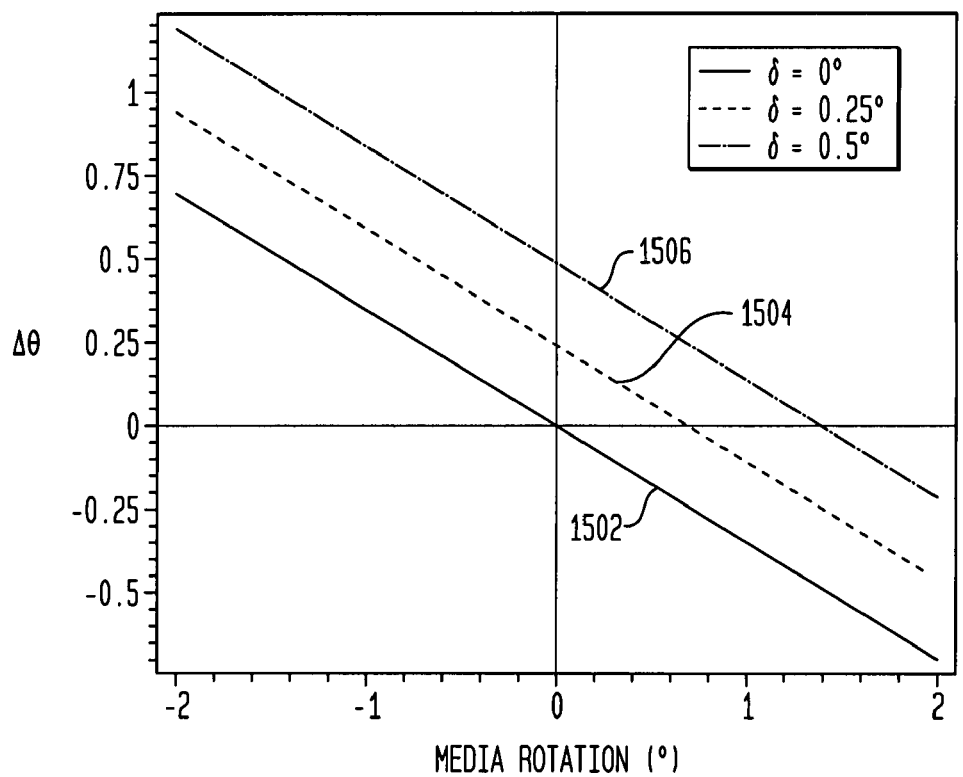
FIG. 15 provides exemplary curves for different medium tilt values, $\delta$, illustrating the difference in reference beam angles for Bragg matching different pixel subsets or page regions versus the medium rotation about the medium normal, in accordance with embodiments of the invention.
Figure 16:
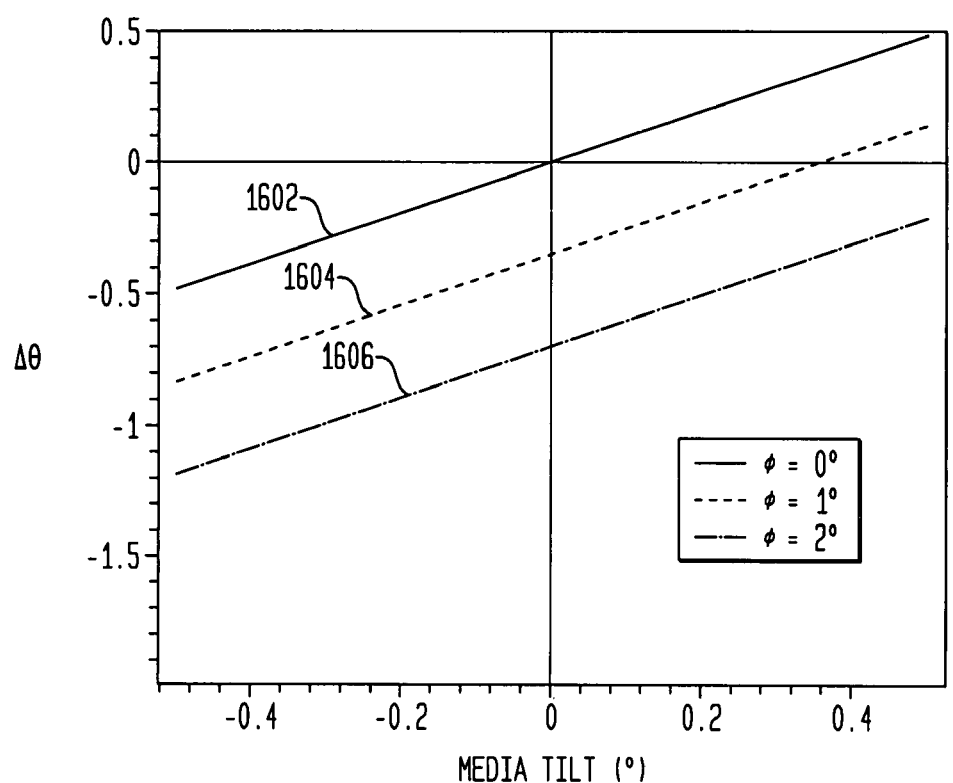
FIG. 16 provides exemplary curves for different media rotations, $\phi$, illustrating the difference in reference beam angles for Bragg matching different pixel subsets or page regions versus medium tilt, in accordance with embodiments of the invention.

A similar method may be used to determine the optimum medium tilt and rotation for recovering the stored data. By carefully selecting the pair of pixels examined, it is possible to have the solution $\Delta\theta(\Delta\lambda,\phi,\delta)$ be independent of the wavelength detuning and only be a function of the medium tilt and rotation. For the exemplary system 100, the pixels (M/2,1) and (M/2,N), have grating vectors located symmetrically above and below the equator of the k-sphere defined by the $\hat{x}$-$\hat{z}$ plane. Again, the function $\Delta\theta(\phi,\delta)$ for this exemplary system and the pixels may be plotted. FIG. 15 illustrates exemplary curves 1502, 1504, and 1506 for different tilts of the holographic medium (δ=0°, 0.25°, 0.5°) versus disk rotation, φ. Particularly, curve 1502 is a curve for a medium tilt of zero degrees, δ=0°, curve 1504 is a curve for a tilt, δ, of 0.25° and curve 1506 is for a medium tilt, δ, of 0.5°. FIG. 16 illustrates exemplary curves 1602, 1604, and 1606 for different media rotations versus medium tilt. Particularly, curve 1602 is a curve for a rotation of zero degrees φ, =0°, curve 1504 is a curve for a rotation, φ, of 1° and curve 1506 is for a rotation of 2°. In FIGS. 15 and 16, the hologram is written using $\theta_W$=30°. From the plots illustrated in FIGS. 15 and 16, it is evident that the detuning, $\Delta\theta(\phi,\delta)$, for these pixels due to tilt and rotation is a linear superposition. While the total $\Delta\theta(\phi,\delta)$ is a function of both the tilt and the rotation of the holographic medium, the change in $\Delta\theta(\phi,\delta)$ versus both rotation and tilt is constant and is insensitive to changes in temperature and wavelength.

Figure 17:
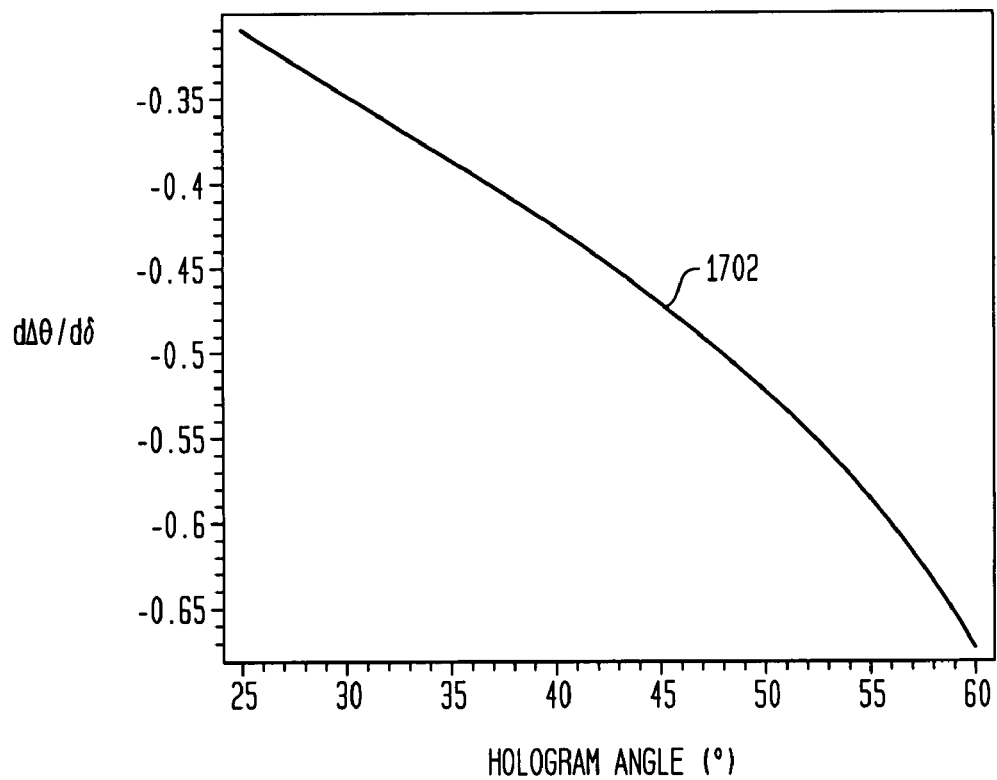
FIG. 17 provides a curve illustrating the change in the difference of reference beam angles to Bragg match pixels versus medium rotation as a function of the writing reference beam orientation, in accordance with embodiments of the invention.
Figure 18:
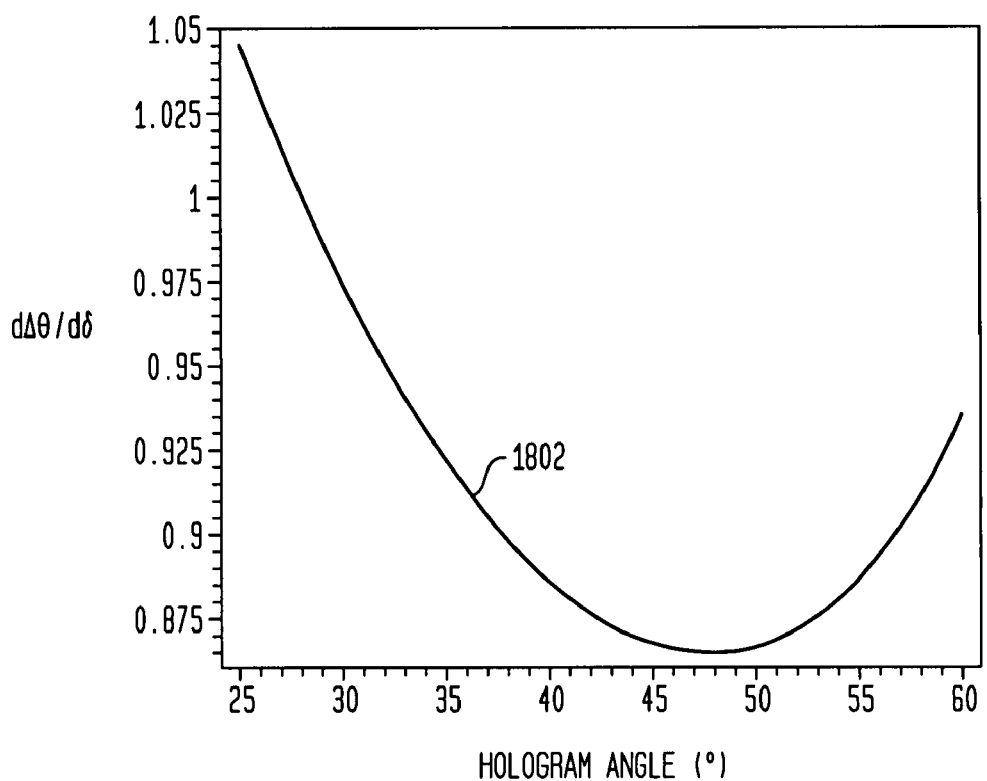
FIG. 18 provides an exemplary curve illustrating the change in the difference in the reference beam angles to Bragg match pixels versus medium tilt as a function of the writing reference beam orientation, in accordance with embodiments of the invention.

Since the difference in the reference beam angles to Bragg match both pixels in this exemplary case is dependent on both the medium tilt and rotation, it is necessary to have two equations to solve for the two unknown variables of $\Delta\theta(\phi,\delta)$. These two equations can be obtained by measuring the difference $\Delta\theta(\phi,\delta)$ using two pages written with different reference beam orientations or using four regions on a single page instead of two. For a system using in-plane angular multiplexing, the derivative of the difference, $\Delta\theta(\phi,\delta)$, versus degree of medium rotation and tilt as a function of the reference beam angle is shown in FIGS. 17 and 18. Particularly, FIG. 17 provides a curve 1702 illustrating the change in the difference of reference beam angles to Bragg match pixels (M/2, 1) and (M/2, N) versus medium rotation as a function of the writing reference beam orientation. FIG. 18 provides an exemplary curve 1802 illustrating the change in the difference in the reference beam angles to Bragg match pixels (M/2, 1) and (M/2, N) versus medium tilt as a function of the writing reference beam orientation. Knowing these functions, the amount of tilt and rotation of the holographic medium can be found by measuring $\Delta\theta(\phi,\delta)$ at two reference beam angles, $\theta_A$ and $\theta_B$. With these two measurements, the tilt, $\delta$, and rotation, $\phi$, of the medium can be found using the following equation:

$$\begin{bmatrix} \delta \\ \phi \end{bmatrix} = \begin{bmatrix} \frac{\partial \Delta\theta(\phi,\delta)}{\partial \delta}\bigg|_{\theta_A} & \frac{\partial \Delta\theta(\phi,\delta)}{\partial \phi}\bigg|_{\theta_A} \\ \frac{\partial \Delta\theta(\phi,\delta)}{\partial \delta}\bigg|_{\theta_B} & \frac{\partial \Delta\theta(\phi,\delta)}{\partial \phi}\bigg|_{\theta_B} \end{bmatrix}^{-1} \begin{bmatrix} \Delta\theta_A \\ \Delta\theta_B \end{bmatrix}$$

where $\Delta\theta_A$ and $\Delta\theta_B$ are the measured differences in reference beam angles to Bragg match the pixels for holograms written at $\theta_A$ and $\theta_B$. Similarly, the differences in reference beam angles to Bragg match four regions on a single data page may also be monitored with similar results. The curves or corresponding data (e.g., tables, formulas, etc.) illustrated in FIGS. 17 and 18 may be determined for the storage system (e.g., prior to shipment) and stored for future use by processor 180 (e.g., in a ROM).

Figure 19:
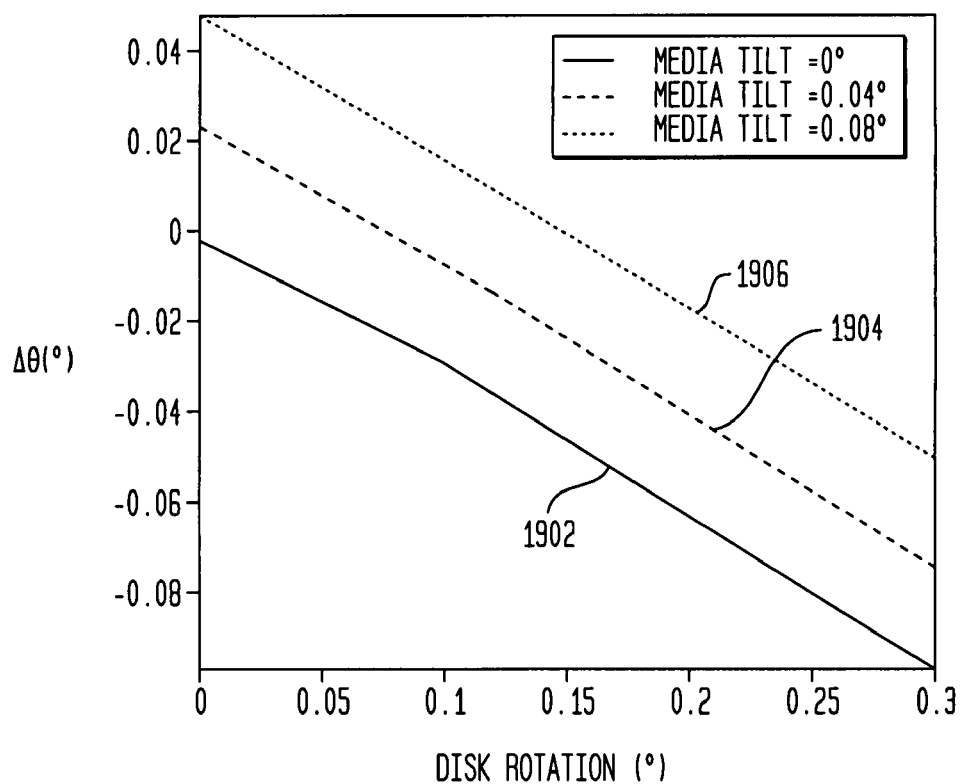
FIG. 19 illustrates an experimentally obtained exemplary curve of the difference in reference beam angles for Bragg matching different pixel subsets versus disk rotation, $\phi$, for three different media tilt values where the angle of the write reference beam, $\theta_W=30$ degrees, in accordance with embodiments of the invention.
Figure 20:
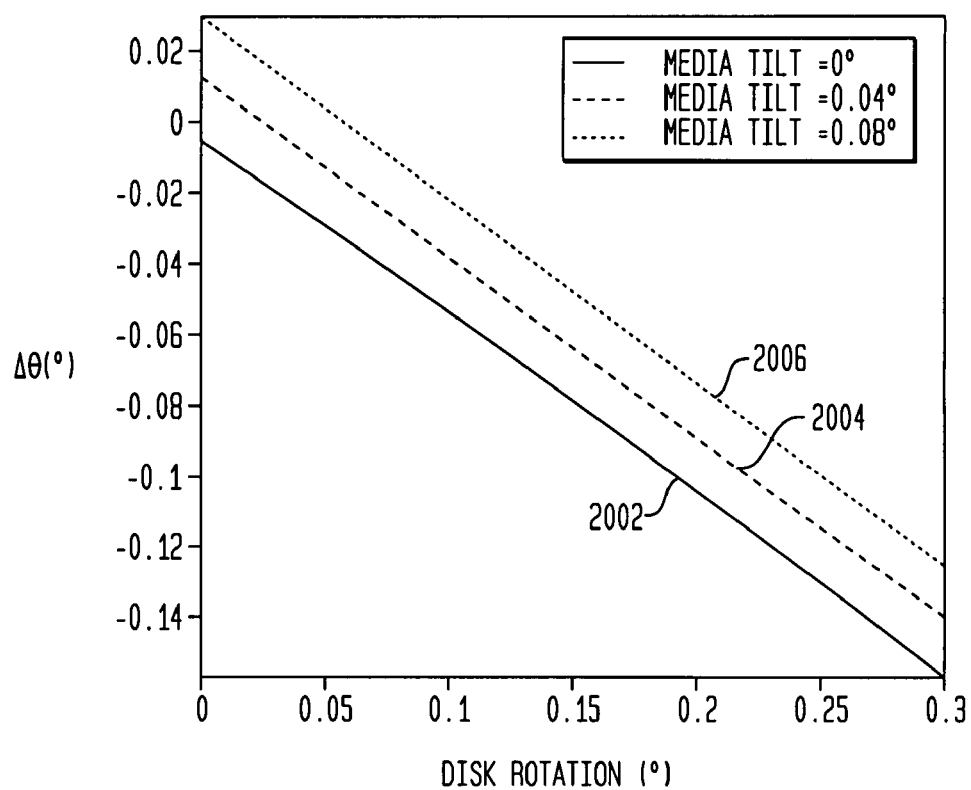
FIG. 20 illustrates an experimentally obtained exemplary curve of the difference in reference beam angles for Bragg matching different pixel subsets versus disk rotation, $\phi$, for three different media tilt values where the angle of the write reference beam, $\theta_W=50$ degrees, in accordance with embodiments of the invention.

This method may be tested versus medium tilt and rotation to test the wavelength tuning for a storage system such as storage system 100. The results, shown in FIGS. 19 and 20, closely match the predictions for medium rotation. Particularly, FIG. 19 illustrates exemplary curves 1902, 1904, and 1906 of $\Delta\theta(\phi,\delta)$ versus disk rotation, $\phi$, for different media tilts where the angle of the write reference beam, $\theta_W$=30 degrees. Curve 1902 illustrates a curve for a medium tilt, $\delta$, of 0°, curve 1904 is for a medium tilt of 0.4°, and curve 1906 is for a medium tilt of 0.8°. FIG. 20 illustrates exemplary curves 2002, 2004, and 2006 of $\Delta\theta(\phi,\delta)$ versus disk rotation, $\phi$, for different medium tilts where the angle of the write reference beam, $\theta_W$, is 50°. Curve 2002 illustrates a curve for a medium tilt, $\delta$, of 0°, curve 2004 is for a medium tilt, $\delta$, of 0.4°, and curve 2006 is for a medium tilt, $\delta$, of 0.8°.

Figure 21:
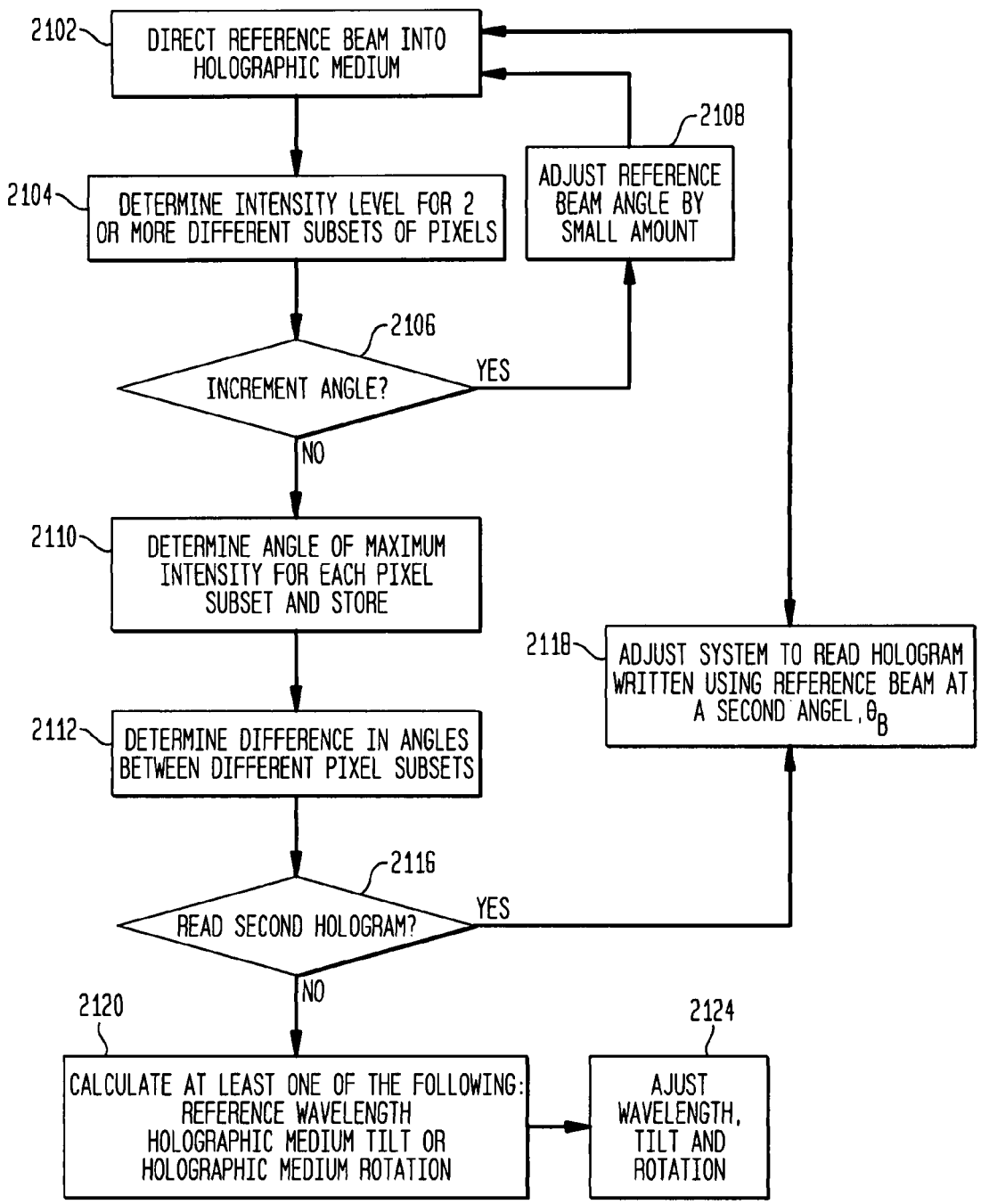
FIG. 21 illustrates an exemplary flow chart of a method of calculating an optimum wavelength, holographic medium tilt, $\delta$, and medium rotation, $\phi$, in accordance with embodiments of the invention.
Figure 22:
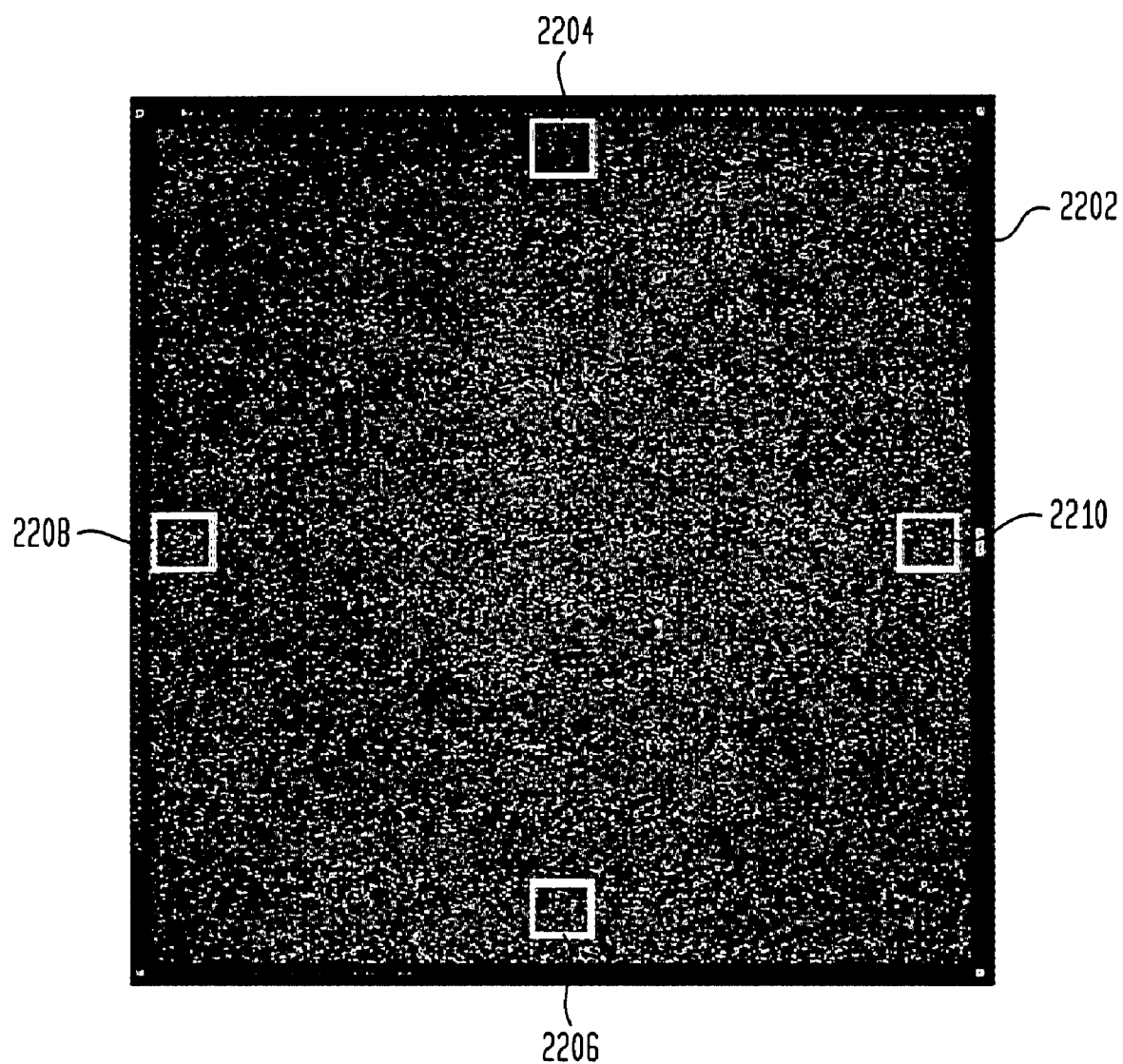
FIG. 22 illustrates an exemplary data page containing windows (or subsets of pixels), in accordance with embodiments of the invention.

As noted above, these equations and curves may be used to examine a data page and calculate an optimum tuning wavelength for the reference beam 162 along with an optimum tilt, $\delta$, and disk rotation, $\phi$. In general, the difference in angles of maximum intensity for two windows may be determined for each unknown variable. This may be done using a single hologram or separate holograms, but since $\Delta\theta(\Delta\lambda,\phi,\delta)$ is a function of three variables, three different equations are needed, in this example, to solve for the unknown wavelength detuning, medium tilt and medium rotation. FIG. 21 illustrates an exemplary flow chart of a method of calculating the optimum wavelength, medium tilt, $\delta$, and/or medium rotation, $\phi$, while FIG. 22 illustrates an exemplary data page 2202 (or SLM image) comprising windows (or subsets of pixels) for use in the method of FIG. 21 for calculating the optimum wavelength, tilt, $\delta$, and disk rotation, $\phi$. As illustrated in FIG. 22, the exemplary data page 2202 comprises four window 2204, 2206, 2208, and 2210, where window 2204 is located in the top center, window 2206 is located in the bottom center, window 2208 is located in the middle left, and window 2210 is located in the middle right of data page 2202. These windows, as illustrated, may be chosen so that they are located at the center of the extreme edges of data page 2202.

The process of FIG. 21 is initiated by directing a reference beam 162 into the storage medium 102 to read the first stored data page of storage medium 102. (Step 2102). Next, the intensity of light for each of the four windows (or subsets of pixels) 2204, 2206, 2208, and 2210 are measured. (Step 2104). Then, it is determined whether measurements at other reference beam angles should be made (Step 2106) by determining if the intensity of all windows (2204, 2206, 2208, and 2210) have yet reached a maximum. In an embodiment, reference beam's 162 initial orientation may be set far enough so that initially no hologram will be Bragg matched. For example, for a data page with a total Bragg width of 0.25° and written with a write reference beam angle of 50°, the initial orientation of the read reference beam may be set to, for example, 50.5°. The reference beam's orientation may then be incrementally adjusted (Step 2108) until it is, for example, 49.5° and intensity in the four windows (2204, 2206, 2208, and 2210) monitored at each reference beam orientation.

Figure 23:
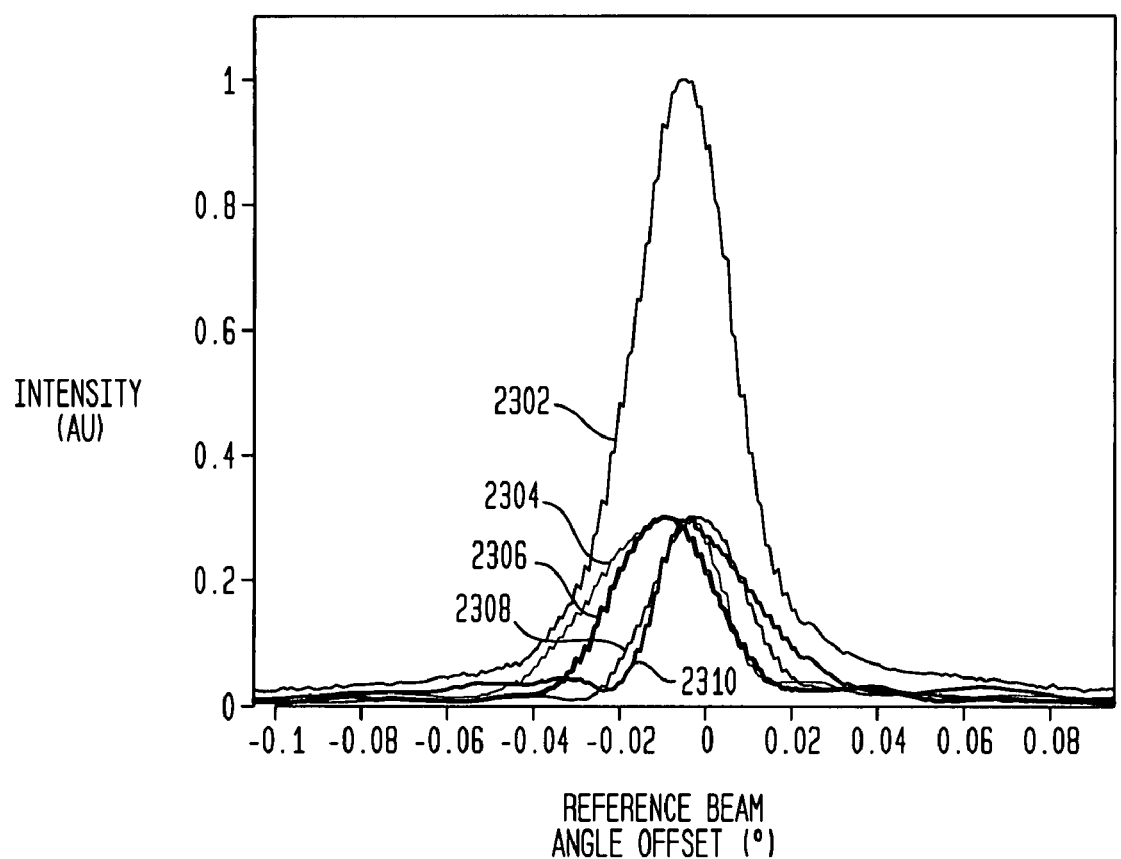
FIG. 23 illustrates an exemplary curve demonstrating the intensity for different regions of a recovered data page as the orientation of the reference beam is changed.

FIG. 23 illustrates an exemplary plot 2300 illustrating measured intensity values versus reference beam orientation (i.e., the reference beam's angle at which it intercepts the storage medium). In this example, wavelength of the reference beam is tuned to the optimum wavelength and the tilt and rotation of the storage medium are set to their optimum positions. Curve 2302 illustrates the detected overall intensity value for the image as a whole, and curves 2304, 2306, 2308, and 2310 illustrate the detected intensity values for the window 2204, 2206, 2208, and 2210, respectively. As may be seen in FIG. 23, the detected intensity values change as the reference beam's orientation changes.

After intensity measurements at all appropriate angles are taken, the angles at which maximum light intensity is detected for each of the four windows (2204, 2206, 2208, and 2210) is stored (Step 2110). Next, the differences in angles ($\Delta\theta$) are calculated between corresponding windows (windows 2204 and 2206 are corresponding and windows 2208 and 2210 are corresponding windows in this example). (Step 2112). This may be accomplished by calculating and storing the difference between the angle, $\theta$, determined to result in the maximum intensity in window 2204 and the angle, $\theta$, determined to result in the maximum intensity in window 2206. Additionally, the difference between the angle, $\theta$, determined to result in the maximum intensity in window 2208 and the angle, $\theta$, determined to result in the maximum intensity in window 2210 is calculated and stored. Because there are only two sets of corresponding windows and three unknowns in the present embodiment, measurements are taken for two data pages prior to calculating the wavelength, tilt, $\delta$, and disk rotation, $\theta$. Thus, it is next determined whether measurements are taken for two data pages. (Step 2116). If only one data page has been scanned, the system is adjusted to read the second data page (Step 2118) and the steps 2102 through 2114 are repeated for the second data page.

After measurements of the angular difference, $\Delta\theta(\Delta\lambda,\phi,\delta)$, between the maximum intensities for corresponding windows are determined for both data pages, the optimum wavelength, holographic medium tilt, $\delta$, and disk rotation, $\phi$, may be calculated in this example. (Step 2120). These may be calculated, for example, by solving the above-discussed equations using, for example, the least squares method or an equivalent thereof.

The wavelength may be calculated using the angular difference, $\Delta\theta$, for maximum intensities for the top and bottom middle windows (2204 and 2206) for either the first or second measured data page. Since the angular difference, $\Delta\theta(\Delta\lambda,\phi,\delta)$, for these example windows in the exemplary setup is only dependent on the wavelength detuning, the above-discussed equation $$\Delta\theta(\Delta\lambda,\phi,\delta)=\theta_{M,N/2}(\Delta\lambda,\phi,\delta)-\theta_{1,N/2}(\Delta\lambda,\phi,\delta)$$

can be solved directly for the wavelength detuning. Once solved, the resulting equation, derivatives, or look up tables may be stored by the storage system's processor (or in a memory, e.g., a Read Only Memory (ROM) in the storage system accessible by the processor). For example, in the example discussed above, solving for this equation results in a linear curve. Thus, in such an example, an equation for this curve or, for example, a look up table or other data (e.g., the slope of the curve) for the curve may be stored by the storage system. Then, the optimum wavelength may be determined by simply dividing the calculated $\Delta\theta$ for windows 2204 and 2206 and dividing $\Delta\theta$ by the slope of this curve. It should be noted that the above-example where the equation resulting from solving for the above equation is a linear equation is but one example, and in other examples, such as, for example, systems with different optical geometries, the resulting equation may be non-linear.

As noted above, in this example, measurements are taken for two data pages prior to calculating the optimum wavelength. In other examples, the optimum wavelength may be calculated after taking the measurements for the first data page. Or, for example, in yet other examples, three data pages may be scanned and the optimum wavelength calculations may be coupled with the rotation and tilt calculations.

Additionally in this example, the tilt, $\delta$, and disk rotation, $\phi$ may also be calculated. This may be calculated using the above discussed formula:

$$\begin{bmatrix} \delta \\ \phi \end{bmatrix} = \begin{bmatrix} \frac{\partial \Delta\theta(\phi,\delta)}{\partial \delta}\bigg|_{\theta_A} & \frac{\partial \Delta\theta(\phi,\delta)}{\partial \phi}\bigg|_{\theta_A} \\ \frac{\partial \Delta\theta(\phi,\delta)}{\partial \delta}\bigg|_{\theta_B} & \frac{\partial \Delta\theta(\phi,\delta)}{\partial \phi}\bigg|_{\theta_B} \end{bmatrix}^{-1} \begin{bmatrix} \Delta\theta_A \\ \Delta\theta_B \end{bmatrix}$$

where $\theta_A$ is the angle of the reference beam for writing the first data page and $\theta_B$ is the angle for writing the second data page and $\Delta\theta_A$ and $\Delta\theta_B$ are the measured differences in reference beam angles to Bragg match the windows 2208 and 2210 for holograms written at $\theta_A$ and $\theta_B$. Since, for this example, the angle difference $\Delta\theta(\Delta\lambda,\phi,\delta)$ for these windows (2208 and 2210) are a linear superposition of difference due to rotation and tilt and are furthermore proportional to the rotation and tilt as shown in FIGS. 15 and 16, the slopes $$\frac{d\Delta\theta}{d\delta} \text{ and } \frac{d\Delta\theta}{d\phi}$$

can be used to find the tilt and rotation using the equation above. These slopes may be calculated for the storage system (e.g., storage system 100) and stored by the storage system's processor (or in memory, e.g., Read Only Memory (ROM) in the storage system accessible by the processor) as is discussed above with reference to FIGS. 15 and 16.

It should be noted that this formula for determining the slopes $$\frac{d\Delta\theta}{d\delta} \text{ and } \frac{d\Delta\theta}{d\phi}$$

is for the present exemplary case where $\Delta\theta$ is not a function of $\Delta\lambda$. Further, this formula is only to the first order, which is appropriate in this example because the functions in this case are linear. In other examples, i.e., system geometries and directions of reference beam scans, where the functions are not linear, different solutions (i.e., numeric methods) and formulas may be used. These solutions and algorithms may be determined, for example, using the same or similar algorithms to the algorithm discussed above for determining the above formula for use in determining the slopes $$\frac{d\Delta\theta}{d\delta} \text{ and } \frac{d\Delta\theta}{d\phi}.$$

In another example, rather than taking measurements for two data pages, measurements for only a single data page may be used to calculate the optimum wavelengths, tilts, and rotation, where four windows located in the corners of the data page are used in conjunction with windows 2204 and 2206 of FIG. 22 for a total of six windows. $\Delta\theta_A$ may be determined using the windows located in the upper corners of the data page and $\Delta\theta_B$ for windows in the lower corners of the data page. The wavelength can be determined using the same method as listed above with regard to windows 2204 and 2206. $\Delta\theta(\Delta\lambda,\phi\delta)$ for $\theta_A$ may then be measured using the right and left windows in the top of the page. And $\Delta\theta(\Delta\lambda,\phi,\delta)$ for $\theta_B$ may be measured using windows at the left and right at the bottom of the page. The tilt and rotation may then be calculated using the identical or a similar method to that discussed above, but using slopes determined for the new window positions. A formula for calculating the slopes, in this example, may be determined using the above-discussed equation:

$$\Delta\theta(\Delta\lambda,\phi,\delta)=\theta_{M,N/2}(\Delta\lambda,\phi,\delta)-\theta_{1,N/2}(\Delta\lambda,\phi,\delta).$$

After the optimum wavelength, tilt, $\delta$, and disk rotation, $\phi$, the storage system's processor (e.g., processor 180 of storage system 100) may direct the system to accordingly change the wavelength, tilt, $\delta$, and disk rotation, $\phi$ used to read the storage medium 102 (Step 2124). For example, processor 180 may direct light source 150 to be tuned to the calculated wavelength and the adjusting device 182 to change the tilt, $\delta$, and disk rotation, $\phi$, of the storage medium to the calculated values. These values may then be used in subsequently reading other (e.g., all other) data pages from storage system 102. Or, for example, processor 180 may measure the SNR for the recovered data and if the SNR drops below a preset threshold, the processor re-measures the optimum wavelength, tilt, $\delta$, and disk rotation, $\phi$, by, for example, repeating the process illustrated in FIG. 21.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method comprising the following steps:
    (a) directing a reference beam into a holographic storage medium to generate a recovered holographic image;
    (b) changing an orientation of the reference beam;
    (c) monitoring, for a plurality of reference beam orientations, an intensity of at least two regions of the recovered holographic image;
    (c) determining for each monitored region of the recovered holographic image, the reference beam orientation at which the monitored intensity of the region is a maximum; and (d) determining, based on a difference between the determined reference beam orientations where the intensity was a maximum, at least one of the following: a tuned wavelength for the reference beam, a tilt angle for the storage medium, or a rotation angle for the storage medium.

2. The method of claim 1, wherein at least one of the monitored regions of the holographic image comprises a subset of one or more pixels of a recovered data page.

3. The method of claim 1, wherein determining at least one of a tuned wavelength for the reference beam, a tilt angle for the storage medium, and a rotation angle for the storage medium comprises the following steps of:
    calculating a difference between the determined reference beam orientations for at least a first monitored region and a second monitored region; and
    determining at least one of a tuned wavelength, a tilt angle, or a rotation angle by dividing the calculated difference by a slope value.

4. The method of claim 3, wherein the slope value is determined based on a slope of a curve determined for the storage system.

5. The method of claim 1, wherein determining at least one of a tuned wavelength for the reference beam, a tilt angle for the storage medium, and a rotation angle for the storage medium comprises the following steps of:
    determining a tilt angle for the storage medium; and
    determining a rotation angle for the storage medium.

6. The method of claim 5, wherein monitoring an intensity of at least two regions of the recovered holographic image for a plurality of reference beam orientations comprises the following step of:
    monitoring, for a plurality of reference beam orientations, at least four regions of the recovered holographic image.

7. The method of claim 5, wherein determining at least one of a tuned wavelength for the reference beam, a tilt angle for the storage medium, and a rotation angle for the storage medium further comprises determining a tuned wavelength for the reference beam.

8. A system for use with a storage medium that holographically stores information, the system comprising:
    a light source which generates a light beam that is a reproduction of a reference beam used in storing information in the storage medium;
    an optical steering subsystem for directing the light beam to the storage medium;
    at least one detector for determining an intensity level of a first subset of one or more pixels of a data page and an intensity level of a second subset of one or more pixels of the data page;
    a processor to control the optical steering subsystem to direct a reference beam into the storage medium to generate a recovered holographic image; direct the optical steering subsystem to change an orientation of the reference beam; to monitor, for a plurality of reference beam orientations, an intensity detected by the at least one detector for at least two regions of the recovered holographic image; to determine for each monitored region of the recovered holographic image, the reference beam orientation at which the monitored intensity of the region is a maximum, and to determine, based on the difference between the determined reference beam orientations, at least one of the following: a tuned wavelength for the reference beam, a tilt angle for the storage medium, or a rotation angle for the storage medium.

9. The system of claim 8, wherein at least one of the monitored regions of the holographic image comprises a subset of one or more pixels of a recovered data page.

10. The system of claim 8, wherein the processor determines at least one of a tuned wavelength, a tilt angle, and a rotation angle by calculating a difference between the determined reference beam orientations for at least a first monitored region and a second monitored region and divides the determined difference by a slope value in determining at least one of a tuned wavelength for the reference beam, a tilt angle for the storage medium, and a rotation angle for the storage medium.

11. The system of claim 10, wherein storage system further comprises a memory storing the slope value.

12. The system of claim 8, wherein the system further comprises:
    at least one adjusting device to adjust the tilt and the rotation of the storage medium; and
    wherein the processor determines a tilt angle and a rotation angle for the storage medium in determining at least one of a tuned wavelength for the reference beam, a tilt angle for the storage medium, and a rotation angle for the storage medium.

13. The system of claim 12, wherein the processor monitors at least four regions of the recovered holographic image.

14. The system of claim 12, wherein the processor further determines a tuned wavelength for the reference beam in determining at least one of a tuned wavelength for the reference beam, a tilt angle for the storage medium, and a rotation angle for the storage medium.

15. A system comprising:
    means for directing a reference beam into a holographic storage medium to generate a recovered holographic image;
    means for changing an orientation of the reference beam;
    means for monitoring, for a plurality of reference beam orientations, an intensity of at least two regions of the recovered holographic image;
    means for determining for each monitored region of the recovered holographic image, the reference beam orientation at which the monitored intensity of the region is a maximum; and
    means for determining, based on the difference between the determined reference beam orientations, at least one of the following: a tuned wavelength for the reference beam, a tilt angle for the storage medium, or a rotation angle for the holographic storage medium.

16. The system of claim 15, wherein at least one of the monitored regions of the holographic image comprises a subset of one or more pixels of a recovered data page.

17. The system of claim 15, wherein the means for determining at least one of a tuned wavelength for the reference beam, a tilt angle for the storage medium, and a rotation angle for the storage medium comprises:
    means for calculating a difference between the determined reference beam orientations for at least a first monitored region and a second monitored region; and
    means for determining at least one or a tuned wavelength a tilt angle, and a rotation angle by dividing the calculated difference by a slope value.

18. The system of claim 17, wherein the slope value is determined based on a slope of a curve determined for the storage system.

19. The system of claim 15, wherein the means for determining at least one of a tuned wavelength for the reference beam, a tilt angle for the storage medium, and a rotation angle for the storage medium comprises:
    means for determining a tilt angle for the storage medium; and means for determining a rotation angle for the storage medium.

20. The system of claim 19, wherein the means for monitoring an intensity of at least two regions of the recovered holographic image for a plurality of reference beam orientations comprises:

means for monitoring at least four regions of the recovered holographic image for a plurality of reference beam orientations.

21. The system of claim 19, wherein the means for determining at least one of a tuned wavelength for the reference beam, a tilt angle for the storage medium, and a rotation angle for the storage medium further comprises:

means for determining a tuned wavelength for the reference beam.

\* \* \* \* \*